(12) United States Patent
Klaban

(10) Patent No.: US 9,438,731 B2
(45) Date of Patent: Sep. 6, 2016

(54) EMERGENCY 9-1-1 PORTAL AND APPLICATION

(71) Applicant: Tools/400 Inc., West Bloomfield, MI (US)

(72) Inventor: Thomas M. Klaban, West Bloomfield, MI (US)

(73) Assignee: Tools/400 Inc., West Bloomfield, MI (US)

(*) Notice: Subject to any disclaimer, the term of this patent is extended or adjusted under 35 U.S.C. 154(b) by 0 days.

(21) Appl. No.: 15/049,695

(22) Filed: Feb. 22, 2016

(65) Prior Publication Data

US 2016/0173689 A1 Jun. 16, 2016

Related U.S. Application Data

(60) Continuation-in-part of application No. 14/828,175, filed on Aug. 17, 2015, now Pat. No. 9,270,824, which is a division of application No. 13/608,141, filed on Sep. 10, 2012, now Pat. No. 9,112,996.

(51) Int. Cl.
| | | |
|---|---|---|
| *H04M 11/04* | (2006.01) | |
| *G06N 5/02* | (2006.01) | |
| *H04M 3/51* | (2006.01) | |
| *H04W 4/02* | (2009.01) | |
| *H04W 4/22* | (2009.01) | |

(52) U.S. Cl.
CPC .......... *H04M 3/5116* (2013.01); *H04W 4/025* (2013.01); *H04W 4/22* (2013.01)

(58) Field of Classification Search
CPC combination set(s) only.
See application file for complete search history.

(56) References Cited

U.S. PATENT DOCUMENTS

| | | | |
|---|---|---|---|
| 5,630,209 A | 5/1997 | Wizgall et al. | |
| 6,370,234 B1 | 4/2002 | Kroll | |
| 7,177,398 B2 | 2/2007 | Meer et al. | |
| 7,289,024 B2 | 10/2007 | Sumcad et al. | |
| 7,764,769 B2 | 7/2010 | Salafia et al. | |
| 7,944,909 B2 | 5/2011 | James | |
| 8,908,835 B1* | 12/2014 | Robbins | H04L 65/1076 379/37 |
| 2002/0057764 A1 | 5/2002 | Salvucci et al. | |
| 2003/0194061 A1 | 10/2003 | Contractor | |
| 2006/0030298 A1 | 2/2006 | Burton et al. | |
| 2007/0015489 A1* | 1/2007 | Jennings | H04W 4/02 455/404.2 |
| 2007/0121799 A1 | 5/2007 | Binning | |
| 2008/0101224 A1 | 5/2008 | Khasnabish | |
| 2008/0188198 A1 | 8/2008 | Patel et al. | |
| 2008/0273670 A1 | 11/2008 | Dickinson | |
| 2009/0010398 A1* | 1/2009 | Nelson | H04M 3/5237 379/45 |

(Continued)

OTHER PUBLICATIONS

Moore, Linda K., Emergency Commuications: The Future of 911; CRS Report for Congress (Jun. 16, 2009).

*Primary Examiner* — Joseph J Nguyen
(74) *Attorney, Agent, or Firm* — Fishman Stewart PLLC

(57) ABSTRACT

A computer aided prioritization (CAP) system may receive, from the emergency event reporter device, an emergency event including a priority selected from a set of event priorities and a type of event selected from a set of event types associated with the selected event priority; determine, based on the emergency event and without querying the emergency event reporter device for additional information, whether the emergency event indicates a higher priority emergency event to be handled by a computer aided dispatch (CAD) system or a lower priority emergency event to be handled automatically by a computer aided event module (CAEM); and selectively route the emergency event report to at least one of the CAD system and the CAEM according to the determination.

17 Claims, 14 Drawing Sheets

(56) References Cited

U.S. PATENT DOCUMENTS

| | | |
|---|---|---|
| 2009/0075703 A1 | 3/2009 | Furbeck |
| 2009/0168974 A1 | 7/2009 | Mc Cormick |
| 2009/0172131 A1 | 7/2009 | Sullivan |
| 2009/0227225 A1 | 9/2009 | Mitchell, Jr. et al. |
| 2009/0249076 A1 | 10/2009 | Reed et al. |
| 2010/0003946 A1 | 1/2010 | Ray et al. |
| 2010/0003948 A1 | 1/2010 | Ray et al. |
| 2010/0003952 A1 | 1/2010 | Ray et al. |
| 2010/0003959 A1 | 1/2010 | Coppage et al. |
| 2010/0003960 A1 | 1/2010 | Ray et al. |
| 2010/0004950 A1 | 1/2010 | Bajko et al. |
| 2010/0056099 A1* | 3/2010 | Kazmi .................. H04M 3/5116 455/404.1 |
| 2010/0166154 A1* | 7/2010 | Peters .................. H04M 3/5116 379/45 |
| 2010/0195805 A1 | 8/2010 | Zeigler et al. |
| 2010/0215153 A1 | 8/2010 | Ray et al. |
| 2010/0246781 A1 | 9/2010 | Bradburn |
| 2010/0261448 A1 | 10/2010 | Peters |
| 2011/0009086 A1 | 1/2011 | Poremba et al. |
| 2011/0058659 A1 | 3/2011 | Merlino |
| 2011/0064205 A1 | 3/2011 | Boni et al. |
| 2011/0105076 A1 | 5/2011 | Bot |
| 2011/0258266 A1* | 10/2011 | Serra .................... H04M 3/5116 709/206 |
| 2012/0196557 A1* | 8/2012 | Reich .................... G06F 19/327 455/404.1 |
| 2012/0196558 A1* | 8/2012 | Reich .................... G06Q 10/10 455/404.1 |

\* cited by examiner

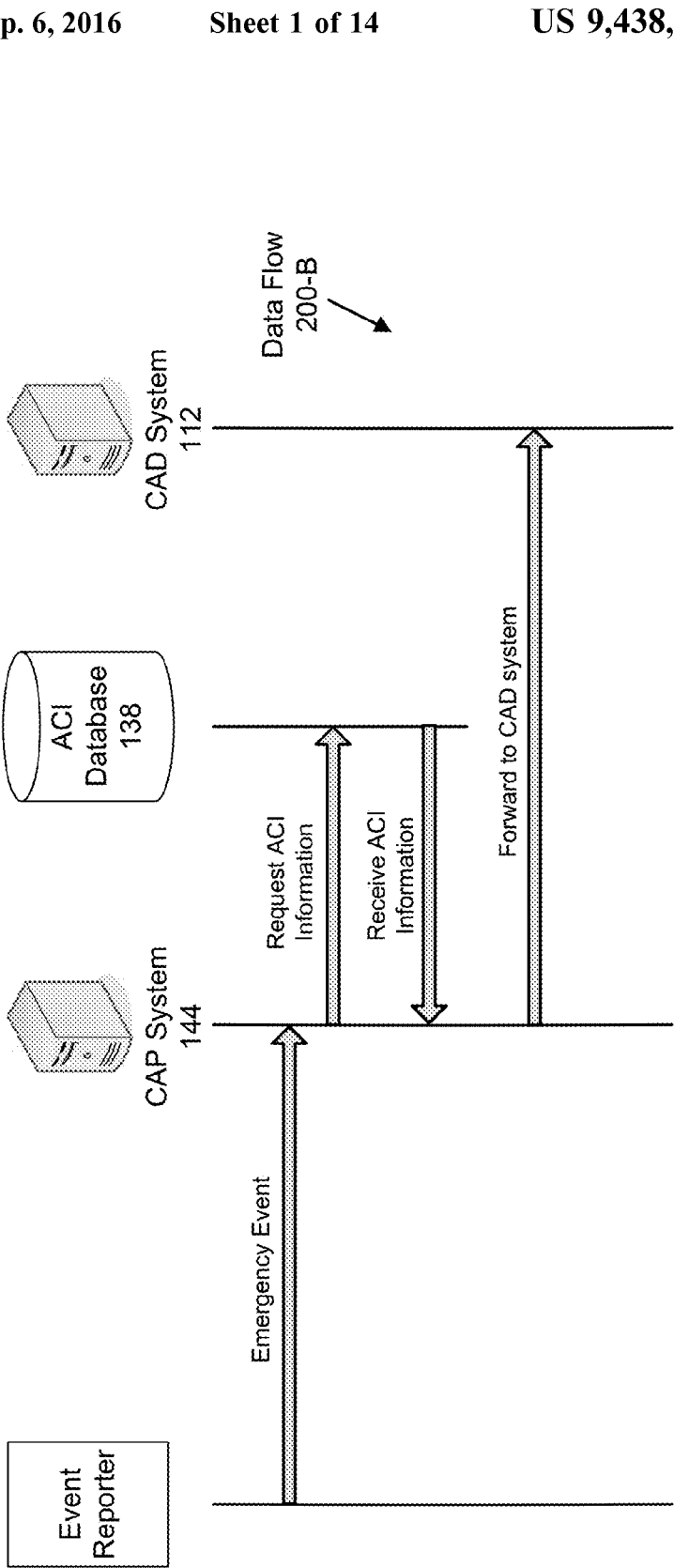

FIG. 11

EMERGENCY 9-1-1 PORTAL AND APPLICATION

CROSS-REFERENCE TO RELATED APPLICATIONS

This application is a continuation-in-part of U.S. patent application Ser. No. 14/828,175 filed on Aug. 17, 2015, which is a continuation of U.S. patent application Ser. No. 13/608,141 filed on Sep. 10, 2012, each of which is hereby incorporated by reference in its entirety.

BACKGROUND

In current caller to emergency dispatch systems (e.g., 9-1-1 dispatch), a dispatcher may ask a multitude of questions to the caller and record the answers. These questions may be directed to determining the caller's name, emergency and location based on the answers given by the caller. Only after collecting all of the necessary information can the dispatcher locate an appropriate nearest first responder to be dispatched to the location of the caller.

One potential cause for slow response time is an inability of the dispatcher to understand the caller. In the best case scenario, the caller is calling from the home address on a clear line with no background noise, and the first responder may be dispatched immediately. In most cases, the caller is somewhere other than their home address, calling from a noisy location, has trouble articulating his or her emergency and location, and the dispatcher has to somehow figure out who to send and where.

Lack of communication arising from language barriers, poor reception or a panic stricken caller who cannot speak or is screaming contributes to delays in response time. In some instances, these issues may cause a complete inability for the dispatcher to dispense a first responder altogether. In domestic violence cases or instances when a caller cannot speak, the situation may become even more desperate because the dispatcher cannot communicate with the caller, and unless an accurate address or global positioning system (GPS) coordinate is established, no first responder can be dispatched.

Traditional emergency dispatch systems are also inefficient in handling possible abandoned calls for which the dispatcher does not hear an audible voice. An emergency dispatcher typically relies on the caller to provide audible voice based information about an emergency type, emergency location, and caller name. When the call has no audible voice or a caller is not responding to the emergency dispatcher questions, the call is flagged as a possible abandoned call and processed in a different manner then calls that are capable of audible voice communication. If caller is using an activated phone with a valid phone number, the emergency dispatcher listens for a waiting period of 30 to 40 seconds, and if no audible voice is detected during this period, the emergency dispatcher performs a re-bid that includes calling back the phone number derived from an Automatic Number Identification (ANI) database, as discussed in further detail below. The emergency dispatcher then listens for a re-bid waiting period of 30 to 40 seconds, and if no audible voice is detected during this period, the emergency dispatcher dispatches a first responder if a valid location can be established but does not dispatch a first responder if a location cannot be identified. If a caller is calling from a de-activated phone such as a phone that does not have a valid phone number (e.g., due to the phone being deactivated), the emergency dispatcher listens for a waiting period of 30 to 40 seconds, and if no audible voice is detected during this period, the emergency dispatcher closes the call. These waiting periods consume at least 40 to 80 seconds of time for each abandoned call and each emergency dispatcher, amounting to significant lost time for emergency dispatchers. As such, traditional emergency dispatch systems have significant time inefficiencies.

With the advent of functionality related to Phase II of the Federal Communications Commissions' E-911 initiative, a location of a caller may be determined by either triangulating the location based on multiple cellular phone towers; or in the case of a smartphone, by way of an exact GPS location determined by the smartphone device. This technology has improved response time, but in some cases several re-bids (i.e., calls from the emergency dispatcher back to the caller with requests for a location) are needed to obtain a useful caller location. In the case of triangulation in metropolitan areas, such location information is rarely accurate enough to locate a caller without his or her assistance.

One way for emergency dispatch systems to associate additional information with an emergency caller is by way of an automatic number identification (ANI)/automatic location identification (ALI) database. The ANI is a database of information configured to store name information and location information associated with telephone lines or telephone numbers. The ANI/ALI database may be used by emergency dispatch to retrieve the physical address and name associated with the telephone line from which a 9-1-1 call originated. This information may not be available for mobile phones that are designated as 9-1-1 only with no mobile plans, or throw away/disposable mobile phones. Also, such information may not be particularly useful to emergency dispatch systems for voice over internet protocol (VoIP) phones or mobile phones, as such devices may be utilized at a location far removed from the physical location on file in the ANI/ALI database. Moreover, the ANI/ALI database provides only limited information about the caller.

As a result, current emergency dispatch systems are fraught with delays and inefficiencies, and in some cases, fail altogether because of communication or technical issues.

BRIEF DESCRIPTION OF THE DRAWINGS

FIG. 1A illustrates an exemplary emergency event including an event type, an event priority, and event details.

FIG. 2B illustrates an exemplary data flow that may be performed by an emergency portal and dispatch system environment utilizing IP technology and configured to handle emergency events.

FIG. 11 illustrates an exemplary user interface of a computer aided prioritization system.

DETAILED DESCRIPTION

Figure 1B:
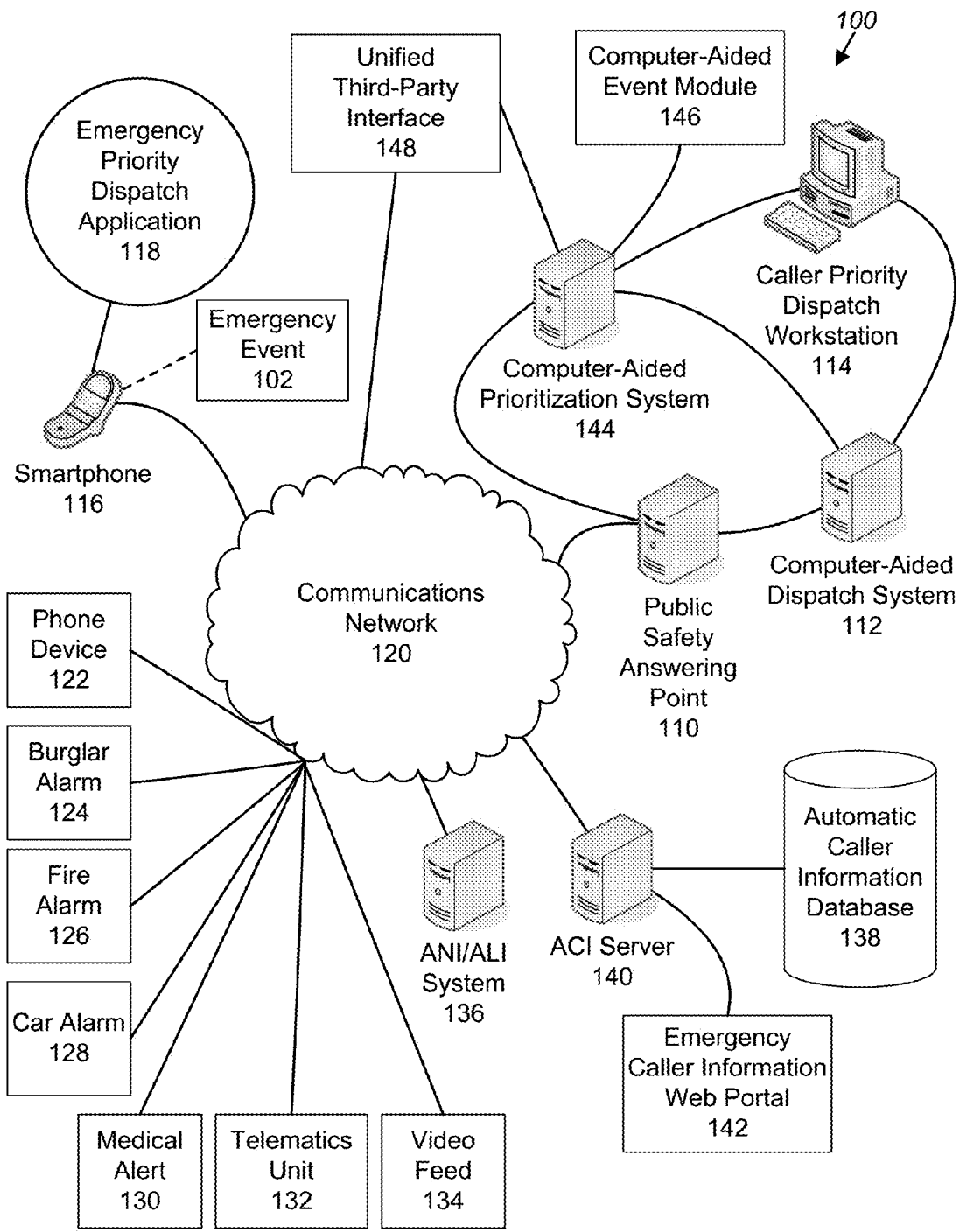
FIG. 1B illustrates an exemplary system for implementing an emergency portal and dispatch system configured to handle emergency events.

An emergency portal and dispatch system may improve the caller-to-emergency dispatch interaction by prioritizing incoming calls, providing additional caller information and creating a unified interface to bridge external emergency data with a computer aided dispatch (CAD) system at an emergency dispatch center. The emergency portal and dispatch system performs these objectives by shifting some of the responsibility onto the caller, business or reporting third-party to electronically provide a priority of the call, a type of emergency, and other pertinent information to the dispatch center so that the emergency dispatcher may dispatch an appropriate first responder in the fastest and most efficient manner possible.

With the emergency priority dispatch architecture, a caller may provide a priority and a type of emergency to dispatch as part of an emergency request or during the establishment of the emergency call, without the need to obtain additional queries for additional information from the dispatch center. This allows the dispatch center to automatically prioritize calls before an emergency dispatcher/call-taker gets involved. Instead of asking probing questions and waiting for answers, the dispatcher/call-taker may become more proactive with the caller by verifying the electronically received information and dispatching the proper first responder in the most expeditious manner. Moreover, the emergency portal may allow low priority, third party and anonymous emergency requests to be processed without any emergency dispatcher involvement.

The emergency priority dispatch may include an emergency priority dispatch (EPD) application executed by a user's communications device. A user may launch the emergency priority dispatch application to begin reporting an emergency. The user may further select a type of connection icon to identify a type of communications session to have with dispatch, such as voice, texting or text-to-speech/speech-to-text. Selecting one of the communications options may trigger a request or may begin call initiation with dispatch. In some cases, the initial request to dispatch may include the priority and type of emergency information. In other cases while waiting for the connection to be established, which in the current centralized automatic message accounting (CAMA) environment may take from 5 to 10 seconds, the emergency priority dispatch application may prompt the caller for one or more of a priority and a type of emergency. If the caller selects a pre-defined type of emergency, the application may execute additional processes that are designed to help emergency dispatch more quickly dispatch the correct and closest first responder. These processes may include, for example, asking the caller questions designed to receive a simple yes/no response, or to asking the caller to select from a limited set options that clearly explain the type of information being requested.

While the caller is communicating with the emergency dispatcher, additional caller emergency information may be transmitted by the emergency priority dispatch application to dispatch. At application setup time, the caller may enter caller emergency information and set a permission level to determine what caller emergency information may be transmitted with what priority and type of emergency.

The emergency priority dispatch user interface may further assist the caller in texting and text-to-speech modes by providing short-cuts to common phrases used in emergency conversations that may be selected by the caller without the need to type in using a keyboard These common phrases may be most helpful in the texting mode because they may clearly explain the emergency and avoid abbreviations that may be ambiguous.

Before or after a first responder is dispatched, the emergency dispatch may retrieve the additional caller emergency information from the emergency priority dispatch application and forward it to the first responder. Or, the additional caller information may be retrieved from a caller information server. Once the first responder arrives at a caller location, and in cases when an emergency dispatcher cannot relay additional caller data information electronically to the first responder, the first responder may be able to retrieve information from the EPD application directly. This also enhances the ability of the first responder to assist the caller, especially in a medical emergency if the caller becomes unavailable, such as after fainting or going into shock. The emergency portal and dispatch system may further provide pertinent personal, medical, handicap and location information to an emergency dispatcher, in order to expedite dispatching of appropriate first responders.

For third-party products that provide incident information, the emergency portal and dispatch system may provide a unified interface that allows prioritization and categorization of dispatch requests with the additional ability of providing and aggregating alarm location, contact information, telematics data, video feeds, pre-plans, photos and other relevant data to minimize emergency dispatcher involvement and cutting the time to dispatch the appropriate first responders.

While the emergency portal and dispatch system is discussed herein in relation to 9-1-1 service as implemented in the United States and Canada, the system is not so limited and is equally applicable to worldwide portal and caller-to-emergency dispatch connectivity and including, for example, 1-1-2 service available in Euro-Zone countries.

As a portion of shifting responsibility from dispatch to the caller, an emergency portal and dispatch system may define an event format for use by the dispatch system. FIG. 1A illustrates an exemplary emergency event 102, including an event priority 104, an event type 106, and optionally, additional event details 108. This event format may be used to allow emergency dispatch to quickly identify and classify incoming emergency events 102.

The event priority 104 included in the emergency event 102 may include a priority selected from a set of event priorities. The set of event priorities may include one or more of: a high priority event indicative of a life-threatening event requiring urgent assistance, a medium priority event indicative of a non-life threatening event requiring urgent assistance, a low priority event indicative of a non-life threatening event not requiring urgent assistance, a third party priority event indicative of a report of information where a user of the emergency event reporter device is not involved, and an anonymous event priority indicative of a report of information where the user of the emergency event reporter device is not involved and wishes to remain anonymous.

The event type 106 included in the emergency event 102 may include a type of event selected from a set of event types associated with the selected event priority 104. The set of event types may include one or more of: medical, accident, fire, child abduction, missing person, domestic violence, assault, robbery, hit & run, storm/property damage, vandalism, loud noise, gang activity, shots fired, riot, burglary, rape, stolen vehicle, stolen property, suspicious persons/activity, suspicious vehicle, observed drug deal, prostitution, among other exemplary types of emergency.

The emergency event 102 may further include additional event details 108, such as any other information associated with the emergency event 102 that may be useful for dispatch to have. Moreover, the additional event details 108 may be supplemented by additional reporters of information to provide additional relevant information to dispatch.

FIG. 1B illustrates an exemplary system 100 for implementing an emergency portal and dispatch system configured to handle emergency events 102. As shown, the system 100 includes a public safety answering point (PSAP) 110 in communication with a computer-aided dispatch (CAD) system 112 which is in turn in communication with caller priority dispatch (CPD) workstations 114. The PSAP 110 may further be in communication with a plurality of reporters of information over a communications network 120. These reporters of information may include a smartphone 116 having an emergency priority dispatch (EPD) application 118, a phone device 122, a burglar alarm 124, a fire alarm 126, a car alarm 128, a medical alert device 130, a telematics unit 132, and a video feed 134. The PSAP 110 may be in communication with reporters of information such as customer premises equipment (CPE) of the caller including telephones, routers, switches, residential gateways (RG), set-top boxes, fixed mobile convergence products, home networking adapters, and Internet access gateways. In some instances, the system 100 may include an ANI/ALI system 136. The system 100 may further include an automatic caller information (ACI) database 138 in communication with an ACI server 140. The ACI server 140 may further provide an emergency caller information (ECI) web portal 142. The system may also include a computer aided prioritization (CAP) system 144 in communication with the PSAP 110, a computer aided event module (CAEM) 146, the CAD system 112, and the CPD workstation 114. System 100 may take many different forms and include multiple and/or alternate components and facilities. While an exemplary system 100 is shown in FIG. 1B, the exemplary components illustrated in FIG. 1B are not intended to be limiting. For example, some examples are implemented without ANI/ALI systems 136. Indeed, additional or alternative components and/or implementations may be used.

As illustrated in FIG. 1B, system 100 may include a PSAP 110. The PSAP 110 may include one or more devices responsible for receiving and handling emergency events 102, such as requests for emergency services such as police, medical and fire. In some cases a PSAP 110 may be associated with a particular geographic area such that requests for emergency services may be routed to the appropriate PSAP 110 for the area. The PSAP 110 may include call distribution functionality, such as functionality configured to route the requests to the CAD system 112.

The CAD system 112 may be configured to receive the emergency events 102 and to selectively forward the emergency events 102 to CPD workstations 114. The CPD workstation 114 may be computing devices used by dispatcher personnel to receive and interact with callers and emergency event 102 information. The CAD system 112 may further be configured to maintain the status of responding resources in the field (e.g., ambulance locations) as well as the status of the various dispatch/call-taker operators and CPD workstations 114. In many cases, the CAD system 112 may be located in a relatively centralized public-safety call center, while in other cases portions of the CAD system 112, such CPD workstations 114, may be located with mobile field personnel.

The smartphone 116 may be implemented as a combination of hardware and software, and may include one or more software applications or processes for causing one or more computer processors to perform the operations of the smartphone 116 described herein. Smartphones 116 may include any cellular or mobile phone that are programmable, and includes, but is not limited to phones running the iOS operating systems distributed by Apple Inc. of Cupertino, Calif., the BlackBerry OS distributed by Research In Motion of Waterloo, Canada, the Android operating system developed by the Open Handset Alliance, and Microsoft Windows® operating system developed by Microsoft Inc. of Redmond, Wash.

One such application installed on the smartphone 116 may be the EPD application 118. The smartphone 116 may be configured to execute the EPD application 118 to perform operations in relation to emergency dispatch, such as providing emergency events 102 to the PSAP 110. Further aspects of the EPD application 118 are discussed in detail below with respect to FIGS. 3-10.

The communications network 120 may provide communications services, such as packet-switched network services (e.g., Internet access and/or VoIP communication services) and/or circuit-switched services (e.g., plain old telephone service (POTS) and/or integrated services digital network (ISDN) services) to various communications devices. Communication devices include, but are not limited to smartphones 116 or other phone devices 122 such as cell phones, VoIP phones, and public switched telephone network (PSTN) phones configured to communicate over the POTS. Communications devices may also include tablet computers, laptop computers, desktop computers or any device other that may provide a communication session over a connection between the PSAP 110 and one or more of a caller, a business, and a third-party emergency product provider.

The communications network 120 may include any combination of wired or wireless forms of communication. For example, the communications network 120 may include cable, optical fibers, cellular towers, etc. In some cases, the communications network 120 may support the use of the CAMA telephone protocol for emergency requests sent to the PSAP 110 such as emergency 9-1-1 calls. Other communication protocols that may be utilized over the communications network 120 may include, but are not limited to, dial-up networking, teletype data transmission, internet protocol (IP) and short message service (SMS)/multimedia messaging service (MMS) messaging, among others.

When utilizing a phone device 122 that lacks an ability to provide emergency events 102, such as a voice-only plain old telephone system telephone, the system 100 may provide compatibility by allowing a dispatcher/call-taker utilizing a CPD workstation 114 to manually enter the event priority 104 and emergency type 106 to facilitate entry of the emergency event 102 into the system 100.

In addition to smartphones 116 and phone devices 122, additional reporters may provide information to dispatch. For example, burglar alarms 124 may provide information regarding break-ins at building locations, fire alarms 126 may provide information regarding fires at building locations, car alarms 128 may provide information regarding auto thefts or break-ins, medical alert device 130 may provide information regarding health emergencies of monitored users, telematics unit 132 may provide information regarding vehicle crashes and history, and video feeds 134 may provide video information relating to past or in-progress incidents. To facilitate the handling of emergencies, these additional reporters of information may provide emergency events 102 including event priority 104, event type 106, and optionally further event details 108.

In some examples, an ANI/ALI system 136 may be included in the system 100 as a reporter of supplemental information for received emergency events 102. For example, the ANI/ALI system 136 may be configured to accept requests for physical address and name information associated with a phone number, perform queries of an ANI/ALI database for the requested information, and respond to the requests by returning the requested name and physical location on file in the ANI/ALI database.

The ACI database 138 may further be included in the system 100 as an additional reporter of supplemental information, and may be configured to store additional information regarding users of the PSAP 110. Initially (or at least prior to the reporting of an emergency), a user may pre-register to have certain predetermined information available to the PSAP 110. For example, the predetermined information may include personal information, location information, medical information, physical/mental handicap information, special needs information, language information, special circumstances information, and emergency contact information, as some examples. Moreover, the user may identify predetermined information as being releasable based on the event type 106 of the emergency. For example, medical information may only be released to the PSAP 110 for medical emergencies of the user, and next-of-kin information may only be released upon death.

Personal information may include, but is not limited to: name, phone number, age, sex, race, height, weight, eye color, hair color, date-of-birth, photo, primary/secondary language, and e-mail address. Location information may include, but is not limited to: physical address, latitude/longitude of address, type of address, type of structure, photo of structure, number of stories, type of utilities, alarms, video cameras, nearest fire hydrant, gated community, nearest cross streets and/or land marks. Medical information may include, but is not limited to: blood type, medical conditions such as diabetes, HIV, food or drug allergies, prior heart attack or any other relevant medical conditions; primary-care physician name, phone number, pager number, e-mail address and preferred hospital. Special-needs and mental/physical handicap information may include, but is not limited to: hearing impaired, visually impaired, mentally impaired, loss of limbs, eye sight, special needs child, physically impaired or young child. Language information may include, but is not limited to: a primary/national language of the system 100, an indication of a secondary language of the system 100, a primary language of a caller, a secondary language of a caller and a flag that indicates whether or not the caller is able to communicate in the primary language of the primary/national language of the system 100. Special circumstances information may include, but is not limited to: dog on premises, confined to bed, confined to wheel chair, elderly person living alone or any other special circumstances that would help the first responder in an emergency situation. Emergency contact information may include, but is not limited to: name, address, phone number, relationship to caller and e-mail address, in what circumstance the emergency contacts will be notified, and what method of notification will be used (e.g., text-to-speech, phone call, SMS Text Message or e-mail).

The ACI server 140 may be configured to receive requests for the predetermined information from dispatch, and may selectively retrieve and provide the predetermined information responsive to the requests. The ACI server 140 may further support an ECI web portal 142 configured to allow the users to add, edit, remove, and otherwise update the predetermined information and conditions for its release. The ECI web portal 142 may provide secure access to allow callers to add or edit stored caller information including, but not limited to: personal, medical, handicap and mental information, as well as location, contact, vehicle and system information. A caller may use the ECI web portal 142 to enter or change their information as well as information regarding their family members including, but not limited to, spouse, significant other, child, parent, other relative, or acquaintance. Other than the authorized callers, access to the stored caller information may be highly secure and limited to personnell with the security clearances. In some cases, a high security firewall may be used to protect the integrity of the data and to ensure its distribution only to authorized PSAP 110 locations.

The CAP system 144 may be configured to receive an emergency event 102 including an event priority 104 selected from a set of event priorities 104 and an event type 106 selected from a set of event types 106 associated with the selected event priority 104. The CAP system 144 may further be configured to determine, based on the emergency event 102, whether the emergency event 102 indicates a higher priority emergency event 102 to be handled by a dispatcher/call-taker (e.g., by the CAD system 112) or a lower priority emergency event 102 or a possible abandoned call to be handled automatically (e.g., by the CAEM 146 discussed in more detail below). This determination may be made by the CAP system 144 without querying the emergency event reporter device for additional information. Based on the determination, the CAP system 144 may further be configured to selectively route the higher-priority emergency event 102 reports to the CAD system 112 and the lower-priority event reports to the CAEM 146.

The CAEM 146 may be configured to automatically handle lower-priority emergency event 102. For example, the CAEM 146 may be configured to return a message to the user indicating that the emergency event 102 was received and will be processed. The CAEM 146 may also be configured to request additional information from the reporter of the emergency event 102. As some examples, the CAEM 146 may be configured to provide pre-formatted phrases to the caller that are designed to receive a simple yes/no response, or to ask the caller to select from a limited set of options that clearly explain the type of information being requested.

The CAEM 146 may include an abandoned call processing method (ACPM). The CAP system 144 may be configured to selectively route possible abandoned calls between the CAD system 112 and the CAEM 146. The CAEM 146 of the CAP system 144 may be configured to automatically handle possible abandoned calls for emergency events 102 including calls for which the dispatcher does not hear an audible voice, e.g., to minimize or bypass the waiting periods typically experienced by an emergency dispatcher. An emergency dispatcher, using the CPD workstation 114 in communication with the CAD system 112, may receive a call by way of the PSAP 110, e.g., using CPE of the caller. The emergency dispatcher, after not hearing an audible voice after a minimal period of time (e.g., 1, 3, or 5 seconds), may flag the call as a possible abandoned call by way of the CPD workstation 114. In response, CPD workstation 114 may transfer the call, along with emergency event 102 information including the event priority 104, event type 106, and a current status (e.g., active, possible abandoned, or abandoned) from the PSAP 110 to the CAP system 144. The CAP system 144 may then utilize the CAEM 146 to manage the possible abandoned call, thereby bypassing the waiting periods for the emergency dispatcher and saving about 50 to 70 seconds for each possible abandoned call and each emergency dispatcher.

The CAP system 144 may utilize the CAEM 146 with the ACPM to manage calls flagged as a possible abandoned call. In response to a possible abandoned call being transferred from the PSAP 110 to the CAPS 114, the CAP system 144 may monitor the possible abandoned call for audible voice, e.g., having a structure or pattern sufficient to identify the presence of a caller and obtain emergency event 102 information. The CAP system 144 may monitor and record the possible abandoned call for a first automated monitoring period of time, e.g., 30 to 40 seconds. Monitoring may include executing a voice or speech recognition algorithm to identify the presence of an audible voice including speech of the caller. Recording may include storing, by way of memory of the CAP system 144, an audio recording of the possible abandoned call. The CAP system 144 may identify caller location information, e.g., by an ALI database, cellular triangulation, GPS, or a combination thereof. The CAP system 144 may also determine whether the possible abandoned call is from an activated phone number (e.g., associated with a valid phone number according to the ANI database) or de-activated phone number (e.g., not associated with a valid phone number according to the ANI database).

If the call is from an activated phone and no audible voice is detected after the first automated monitoring period, the CAP system 144 may utilize the ACPM to initiate a re-bid to call back the phone number derived from the ANI database. The CAP system 144 may then monitor the call for a second automated period of time, e.g., 30 to 40 seconds, to determine if an audible voice is detected. If no audible voice is detected during the second automated period of time, and the CAP system 114 can identify the caller location, the CAP system 114 may transfer the possible abandoned call, along with emergency event 102 information including the event priority 104, event type 106, the caller location, and the current status, to the CAD system 112. The emergency dispatcher, by way of the CPD workstation 114, may dispatch a first responder to the caller location. If the caller location cannot be established, the CAPS 114 may transfer the possible abandoned call, along with emergency event 102 information including the event priority 104, event type 106, and the current status, to CAD system 112. In this instance, the CAD system 112 may then close the call without dispatching a first responder and with the current status as abandoned.

If a call is from a de-activated phone and no audible voice is detected, the CAP system 144 may wait the first automated monitoring period, e.g., 30 to 40 seconds. If the CAP system 144 can identify a caller location, the CAP system 144 may utilize the ACPM to transfer the possible abandoned call, along with emergency event 102 information including the event priority 104, event type 106, the caller location, and the current status, to CAD system 112. The emergency dispatcher, by way of the CPD workstation 114, may dispatch a first responder to the caller location. If a valid location cannot be established, the CAP system 144 will transfer the call, along with emergency event 102 information including the event priority 104, event type 106, and the current status, to CAD system 112. The CAD system 112 may then close the call without dispatching a first responder and with the current status as abandoned.

If an audible voice is detected at any time by the CAP system 144, the CAP system 144 may immediately transfer the call back to the CAD system 112 in communication with the CPD workstation 114 of the emergency dispatcher. The CAP system 144 may also send along with emergency event 102 information including the event priority 104, event type 106, event location, and current status to the CPD workstation 114, e.g., to alert the emergency dispatcher of any changes. The CAP system 144 may also transfer the audio recording to the CPD workstation 114 of the emergency dispatcher. The CPD work station 114 may replay audio recording to the emergency dispatcher, e.g., upon transferring the audio recording or upon request by way of the CPD work station 114.

The CAP system 144 may be further configured to supplement information included in the emergency event 102 according to a predetermined rule for including additional information. As some examples, the predetermined rule for including additional information in the emergency event 102 may include one or more of: (i) a rule making pre-entered emergency information available based on at least one of the selected event priority 104 and the event type 106 of the emergency event 102; (ii) a rule including telematics data in emergency event 102 reports for events including a vehicle; (iii) a rule including health information in emergency event 102 reports for events requiring medical attention; (iv) a rule including additional contact information in the emergency event 102 reports for events requiring notification of emergency contacts; (v) a rule including floor-plan information for emergency event 102 reports requiring access to a building; (vi) a rule including picture or video information for emergency event 102 reports for which picture or video information is available; and (vii) a rule including vehicle information for emergency events 102 that involve vehicles. If the conditions of one or more of these rules are triggered based on the fields of the emergency event 102, the CAP system 144 may be configured to retrieve the additional information from one or more of the ANI/ALI system 136 and the ACI server 140.

Moreover, additional reporters may provide information to dispatch. The unified third-party interface 148 of the CAP system 144 may be configured to receive such information in a uniform manner. For example, one or more of the burglar alarms 124, fire alarms 126, car alarms 128, medical alert device 130, telematics units 132, and video feeds 134 may provide information to the CAEM 146 for the predetermined rules by way of the unified third-party interface 148 of the CAP system 144. Exemplary supplemental information to be received via the third-party interface 148 may include: type of alarm or emergency, emergency contacts, business name, business location, hazardous material information, sprinkler information, telematics, video feeds, photos, architectural drawings, pre-plans/evacuation information, etc. and any other information that will enable the emergency dispatcher to expedite dispatching the appropriate first responders. Moreover, the third-party interface 148 may also be configured to receive emergency events 102 from various event reporters, the received emergency events 102 including an event priority 104 and an event type 106, similar to as discussed above with respect to caller-reported incidents.

The CAP system 144 may further be configured to present the selected event priority 104, event type 106, event details 108 and any additional supplemental information to a dispatcher/call-taker associated with the CAD system 112 before, or while a communications session is established between a dispatcher/call-taker of the CAD system 112 and the reporting device (e.g., the smartphone 116 executing the EPD application 118).

As a more specific example, the CAP system 144 may be configured to receive an emergency event 102 from a smartphone 116 executed an EPD application 118. The EPD application 118 may connect to the CAP system 144 utilizing a data connection and may provide a unique identifier associated with the network device (e.g. phone number, serial number etc.) to the CAP system 144. The EPD application 118 may substantially simultaneously connect to the PSAP 110 utilizing a voice and/or data connection (depending on the capabilities of the PSAP 110), and may pass the unique networked computing device identifier from the PSAP 110 to the CAP system 144. The unique networked computing device identifier passed by the PSAP 110 to the CAP system 144 may then be associated with the networked computing device identifier passed to the CAP system 144 directly, in order to allow the CAP system 144 to make a positive identification of the event reporter. Once a positive identification has been made, the CAP system 144 may be configured to transmit the emergency event 102 and appropriate personal, medical, physical/mental handicap, contact, location and vehicle information to the CPD workstation 114 or to the CAEM 146 for processing.

With respect to the reporting of emergency events 102 by third-party event reporters, such as burglar alarms 124, fire alarms 126, car alarms 128, medical alert devices 130, telematics units 132 and video feeds 134, a communications session may be established with the CAP system 144 over which an emergency event 102 may be provided. The emergency event 102 may include information such as a unique identifier associated with the third party device (e.g. serial number, account number etc.), an event priority 104 and an emergency type 106. The CAP system 144 may be configured to route the emergency event 102 along with any additional event details 108 (e.g., location, contact, pre-plan, video, personal, medical, physical/mental handicap, or vehicle information) to the appropriate CPD workstation 114 or to the CAEM 146 for processing.

Figure 2A:
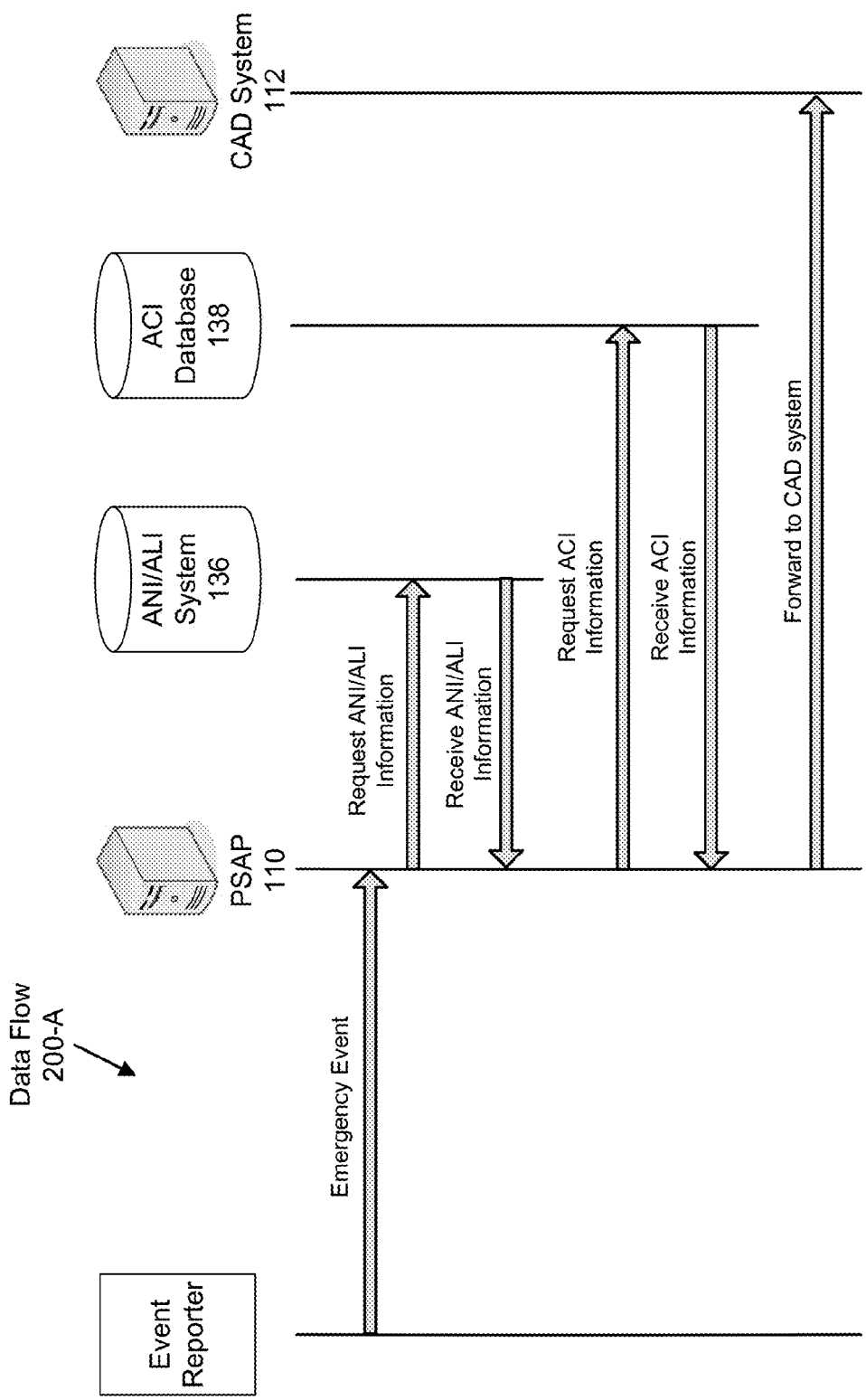
FIG. 2A illustrates an exemplary data flow that may be performed by an emergency portal and dispatch system environment utilizing existing ANI/ALI functionality and configured to handle emergency events.

FIG. 2A illustrates an exemplary data flow 200-A that may be performed by an emergency portal and dispatch system 100 environment utilizing existing ANI/ALI functionality and configured to handle emergency events 102. The data flow 200-A may be performed by various devices, such as by the CAP system 144 in communication with an ANI/ALI system 136 and one or more event reporters over a communications network 120. The exemplary data flow 200-A may be performed in systems 100 in which ACI functionality is integrated into an existing PSAP 110 system utilizing ANI/ALI information.

The exemplary data flow 200-A may begin with an emergency event 102 being generated by an event reporter. Exemplary event reporters may include any of the reporters discussed above, such as a smartphone 116 executing an EPD application 118, a phone device 122, a burglar alarm 124, a fire alarm 126, a car alarm 128, a medical alert device 130, a telematics unit 132, or a video feed 134. The emergency event 102 may include an event priority 104 and an event type 106, as discussed above.

The CAP system 144 may receive the emergency event 102 from the event reporter. In some examples, the emergency event 102 may be received by the CAP system 144 over the communications network 120 via the PSAP 110. In other examples, the emergency event 102 may be received by the CAP system 144 via a third-party interface 148.

Upon receipt of the event, the CAP system 144 may be configured to request ANI/ALI information from the ANI/ALI system 136 according to the received emergency event 102. For example, based on an identifier included in the emergency event 102 such as a phone number of the caller, the CAP system 144 may request the ANI/ALI system 136 to query an AN/ALI database for the physical address and name associated with the caller from which the emergency event originated. The CAP system 144 may further be configured to receive the requested ANI/ALI information. For example, responsive to the request, the ANI/ALI system 136 may provide the requested information, and may return the requested name and physical location on file in the ANI/ALI database. The CAP system 144 may be configured to supplement the information of the emergency event 102 according to the received ANI/ALI information. This additional information may be incorporated into the emergency event 102 as additional event details 108.

The CAP system 144 may be further configured to supplement the information of the emergency event 102 according to a predetermined rule keyed to at least a portion of the information received from the ANI/ALI system 136 and additional information in the emergency event 102. As an example, the CAP system 144 may identify based on the event type 106 of the emergency event 102 that the emergency event 102 indicates a medical emergency for an identified user. Accordingly, the CAP system 144 may invoke a rule making pre-entered emergency information for the user available based on at least one of the selected event priority 104 and the event type 106 of the emergency event 102. The pre-entered emergency information may have been previously entered by the user by way of the ECI web portal 142.

Continuing with the medical emergency event 102 example, the CAP system 144 may request certain predetermined medical information from the ACI database 138 that is intended to be provided to the CAD system 112 in the case of a medical emergency. The ACI database 138 may respond to the request with the requested information. The CAP system 144 may then incorporate the supplemental information into the emergency event 102 as additional event details 108, and may forward the supplemented emergency event 102 to the CAD system 112 for further processing (or to the CAEM 146 for a lower-priority emergency event 102).

FIG. 2B illustrates an exemplary data flow 200-B that may be performed by an emergency portal and dispatch system 100 environment utilizing IP technology and configured to handle emergency events 102. Similar to the exemplary data flow 200-A, the exemplary data flow 200-B may also be performed by various devices, such as by the CAP system 144 in communication with one or more event reporters over a communications network 120.

Similar to the exemplary data flow 200-A, the exemplary data flow 200-B may begin with an emergency event 102 being generated by an event reporter. Upon receipt of the emergency event 102, the CAP system 144 may be configured to determine whether any ACI information related to the emergency event 102 was received. For example, an emergency event 102 may be received from a smartphone 116 executing an EPD application 118, where the event requires supplementation according to any applicable rules. In other examples, an emergency event 102 may be received where the EPD application 118 has already supplemented the emergency event 102 with locally-stored additional event details 108. In such an instance, further supplementation of the emergency event 102 may be unnecessary. In some examples, regardless of whether the emergency event 102 was supplemented by the reporting event reporter, the CAP system 144 may determine to supplement the event according to the ACI database 138.

If the CAP system 144 determines to supplement the information of the emergency event 102, may be configured to supplement information included in the emergency event 102 according to a predetermined rule for including additional information based on the information of the emergency event 102 directly, without requiring the use of an ANI/ALI system.

For instance, the CAP system 144 may query the ACI database 138 for information based on one or more of an identifier of the caller associated with the emergency event 102 (e.g., an IP address from which the emergency event was received 102, a caller name, login ID, or other handle included in the emergency event 102, etc.), an event priority 104 of the event, and an event type 106 of the event. The ACI database 138 may provide the requested information back to the CAP system 144, and the CAP system 144 may incorporate the supplemental information into the emergency event 102 as additional event details 108. The CAP system 144 may then forward the supplemented emergency event 102 to the CAD system 112 for further processing (or to the CAEM 146 for a lower-priority emergency event 102).

Figure 3:
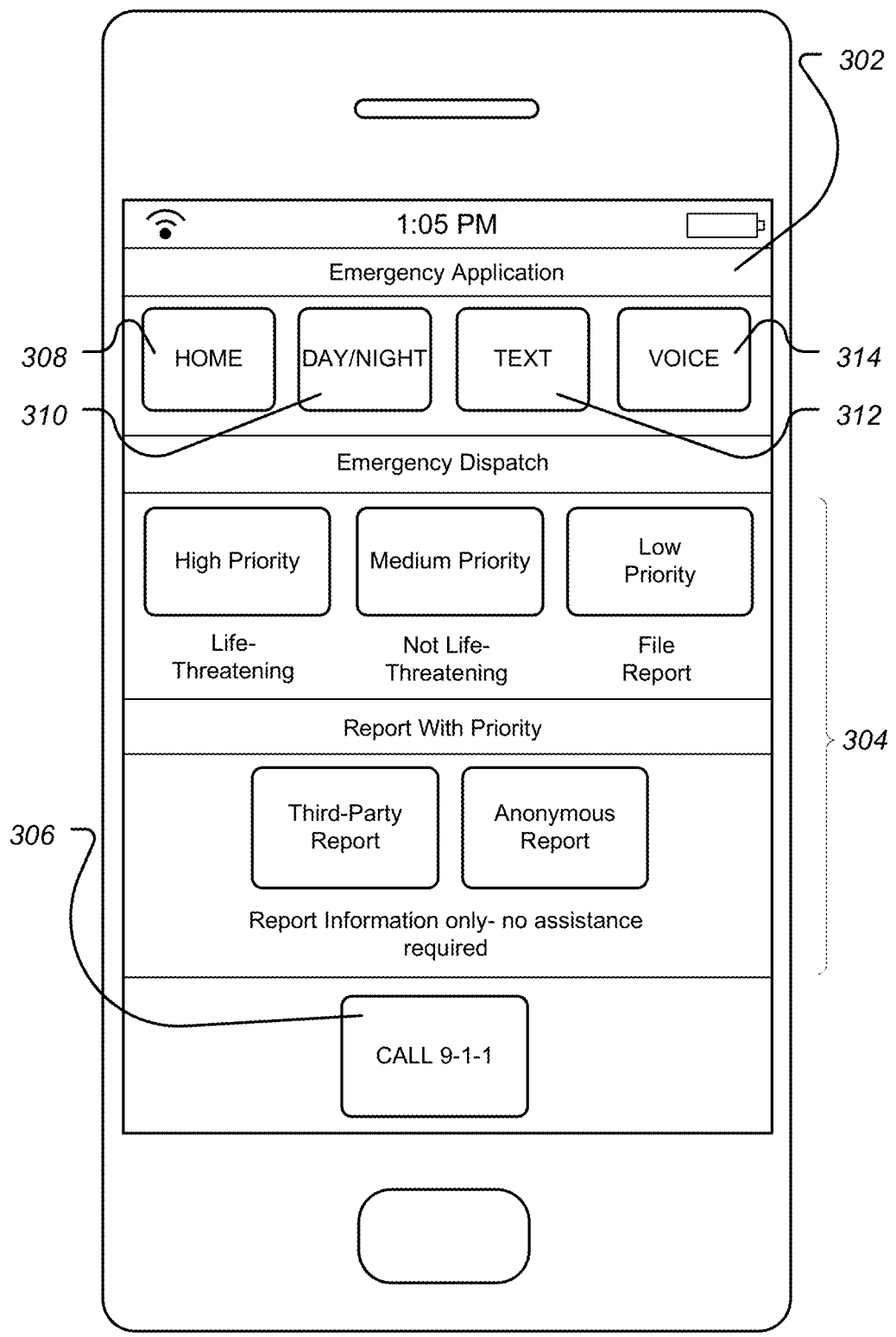
FIG. 3 illustrates an exemplary user interface of an emergency priority dispatch application for selecting a priority for an emergency event.

FIG. 3 illustrates an exemplary user interface 302 of an EPD application 118 for selecting an event priority 104 for an emergency event 102. The user interface 302 may be provided, for example, by a smartphone 116 executing the EPD application 118.

As illustrated, the user interface 302 may include priority controls 304 configured to allow a user to select a relevant event priority 104. The user interface 302 may accordingly receive a user selection of the event priority 104 upon a user selection of one of the priority controls 304. For example, the user interface 302 may include priority controls 304 for the selection of high priority, medium priority, low priority, third-party report priority, and anonymous priority event priorities 104.

A high priority event priority 104 may identify a life-threatening event needing an immediate response. Exemplary high priority event types 106 may include medical emergencies, immediate physical dangers such as domestic violence, fires or any other life threatening event.

A medium priority event priority 104 may identify a non-life threatening even still requiring a fast response. Exemplary medium priority event types 106 may include hit & run, vandalism, an accident with no obvious injuries, a storm/property damage with no obvious injuries, an unarmed robbery in progress, etc.

A low event priority 104 may identify a non-life threatening event not requiring an immediate response. Exemplary low priority event types 106 may include filing a police report after the fact for a burglary not in progress, a minor accident, minor storm or property damage, vandalism, stolen vehicle or property, etc.

A third-party event priority 104 may identify an event where the caller is not physically involved, but wants dispatch to be aware of the situation. Exemplary third-party event types 106 may include the reporting of a car accident where the caller is not physically involved, the reporting of a suspicious person/activity or vehicle, the reporting of a drug dealer or deal in progress, or the reporting of prostitution or shooting in an area.

An anonymous event priority 104 is similar to a third-party event priority 104, except the identity of the reporter may be kept confidential from dispatch. The anonymous option encourages callers to report suspicious activity without the fear of being found out. This may be a useful priority 104 in certain situations, such as for children in school who see event types 106 such as bullying, illegal activity such as consuming alcohol or selling drugs, or for any person who wants to report a crime or other illegal activity without identifying themselves. This information may then be distributed to neighborhood watch groups as well as to law enforcement.

The user interface 302 may also include a bypass control 306 configured to allow the user to connect with dispatch directly without specifying the event priority 104, a home control 308 configured to allow the user to return to a home page of the EPD application 118, a day/night control 310 configured to toggle the background of the EPD application 118 for better day or night visibility.

Texting communication may be established between the EPD application 118 and dispatch upon selection of a texting control 312 from the EPD application 118. More specifically, the EPD application 118 may be configured to cause the smartphone 116 to send and receive text messages with the CAP system 144. The CAP system 144 in turn may pass the text messages between the smartphone 116 and a CPD workstation 114 of a dispatcher communicating with the user of the EPD application 118. Accordingly, the text messages may be displayed to the dispatcher/call-taker. In some cases, the dispatcher/call-taker may further utilize pre-formatted messages, such as questions designed to receive a simple yes/no response, or asking the caller to select from a limited set of options that clearly explain the type of information being requested. These pre-formatted messages may be set up through the CAP system 144 and stored on the ACI server 140 or in the ACI database 138.

Voice communication may be established between the EPD application 118 and dispatch upon selection of a voice control 314 from the EPD application 118. To facilities the voice communication, the PSAP 110 may receive a voice call initiated by the EPD application 118 of the smartphone 116. The PSAP 110 may accordingly route the received voice call to an appropriate dispatcher/call taker or CPD workstation 114. In voice mode, the CPD workstation 114 may be used by the dispatcher/call-taker to enter an event priority 104 and an event type 106 to be passed to the CAP system 144.

Figure 4:
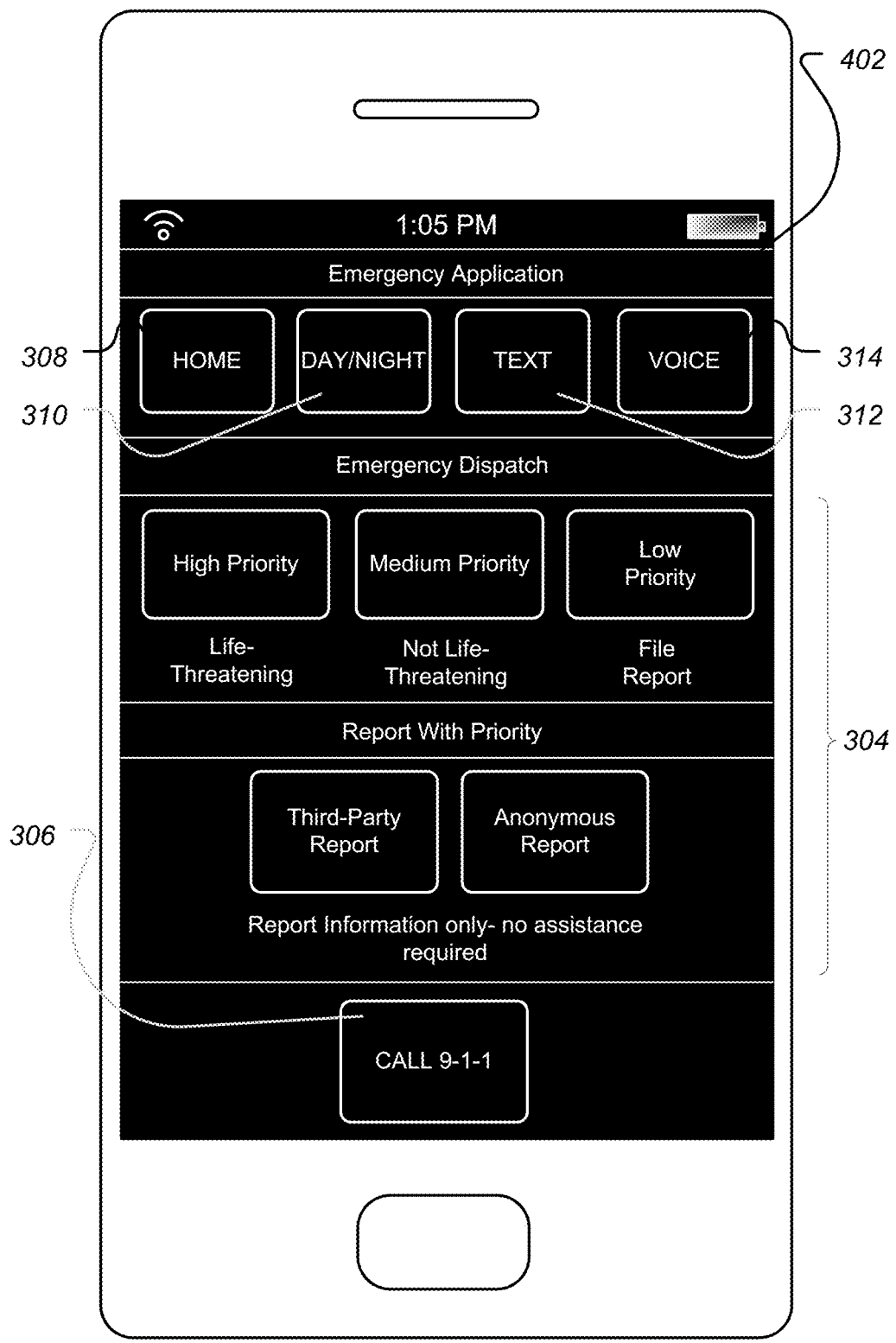
FIG. 4 illustrates an exemplary user interface of an emergency priority dispatch application in night mode.

FIG. 4 illustrates an exemplary user interface 402 of an EPD application 118 in night mode. The user interface 402 may be displayed, for example, upon selecting the day/night control 310 configured to toggle the background of the EPD application 118. The user interface 402 in this instance may be an exemplary night mode version of the user interface 302 discussed above. The night mode may display the same information as the day mode, but may do so with a dark background rather than a light background. The dark background may be more readable in a dark environment, and may also allow a user to report an emergency event 102 without throwing a large amount of light and being spotted.

Figure 5:
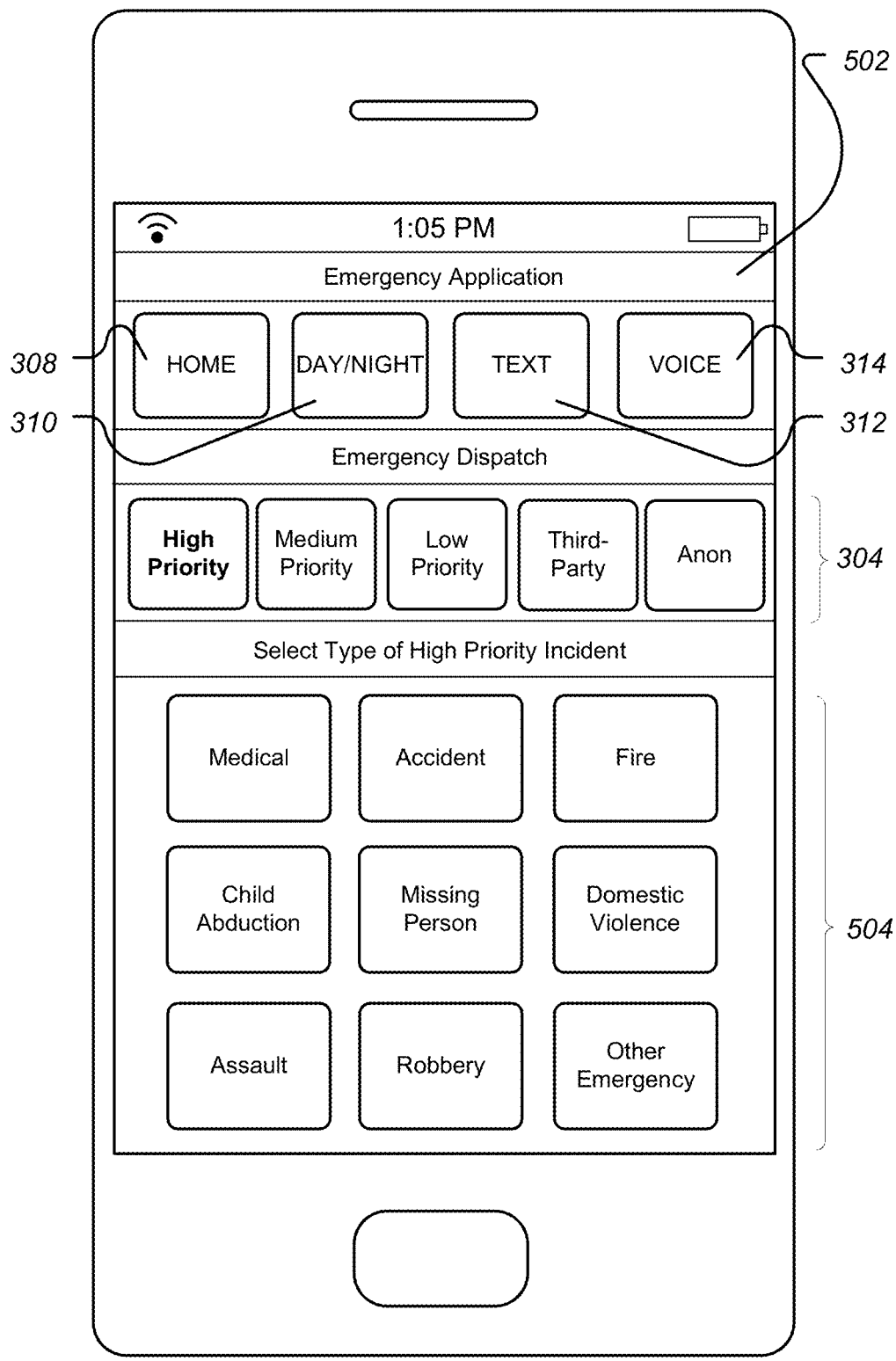
FIG. 5 illustrates an exemplary user interface of an emergency priority dispatch application for selecting an event type of a high priority emergency event.

FIG. 5 illustrates an exemplary user interface 502 of an EPD application 118 for selecting an event type 106 of a high priority emergency event 102. Similar to the user interface 302, the user interface 502 may include a home control 308 configured to allow the user to return to a home page of the EPD application 118, a day/night control 310 configured to toggle the background of the EPD application 118 for better day or night visibility, a texting control 312 configured to access texting functionality, and a voice control 314 configured to access voice functionality.

Moreover, similar to the user interface 402, the user interface 502 may also include priority controls 304 for the selection of high priority, medium priority, low priority, third-party report priority, and anonymous priority emergency events 102. In the illustrated example, a high priority event type 106 was selected (e.g., from the user interface 302). The user interface 502 may further include an indication that the high priority event type 106 was selected, for example, by highlighting the priority control 304 associated with a high priority event type 106.

Additionally, the user interface 502 may include type controls 504 for the selection of different event types 106 of emergency events 102. The available event types 106 may be those event types 106 associated with the selected event priority 104. For example, upon receiving a selection of a high priority event priority 104, the user interface 502 may provide type controls 504 for a set of high priority event types 106, such as a medical emergency, an accident, a fire, a child abduction, a missing person, a domestic violence incident, an assault, a robbery, and another emergency to be specified by a user. The user interface 502 may be configured to allow a user to select the type control 504 associated with the event type 106 for the emergency event 102 being reported.

Upon selection of the event priority 104 and event type 106 (and potentially after receiving a user confirmation) the EPD application 118 may cause the smartphone 116 to submit the emergency event 102 to the CAP system 144.

Figure 6:
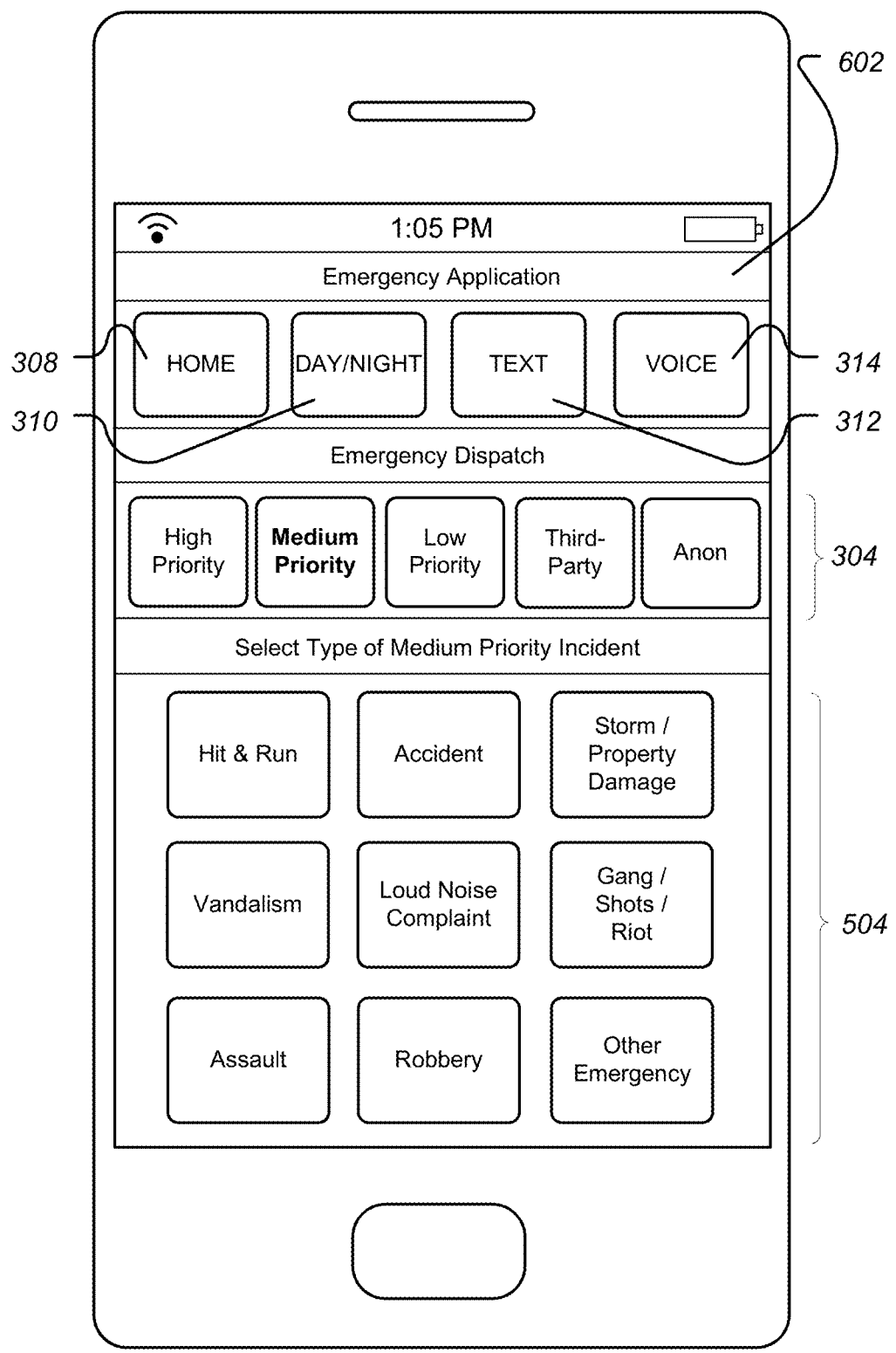
FIG. 6 illustrates an exemplary user interface of an emergency priority dispatch application for selecting an event type of a medium priority emergency event.

FIG. 6 illustrates an exemplary user interface 602 of an EPD application 118 for selecting an event type 106 of a medium priority emergency event 102. For example, upon receiving a selection of a medium priority event priority 104, the user interface 602 may provide type controls 504 for a set of medium priority event types 106, such as a hit & run accident, an accident, a storm or property damage, vandalism, a loud noise complaint, gang/shots fired/riots, an assault, a robbery, or another emergency to be specified by a user. The user interface 602 may be configured to allow a user to select the type control 504 associated with the event type 106 for the emergency event 102 being reported.

Figure 7:
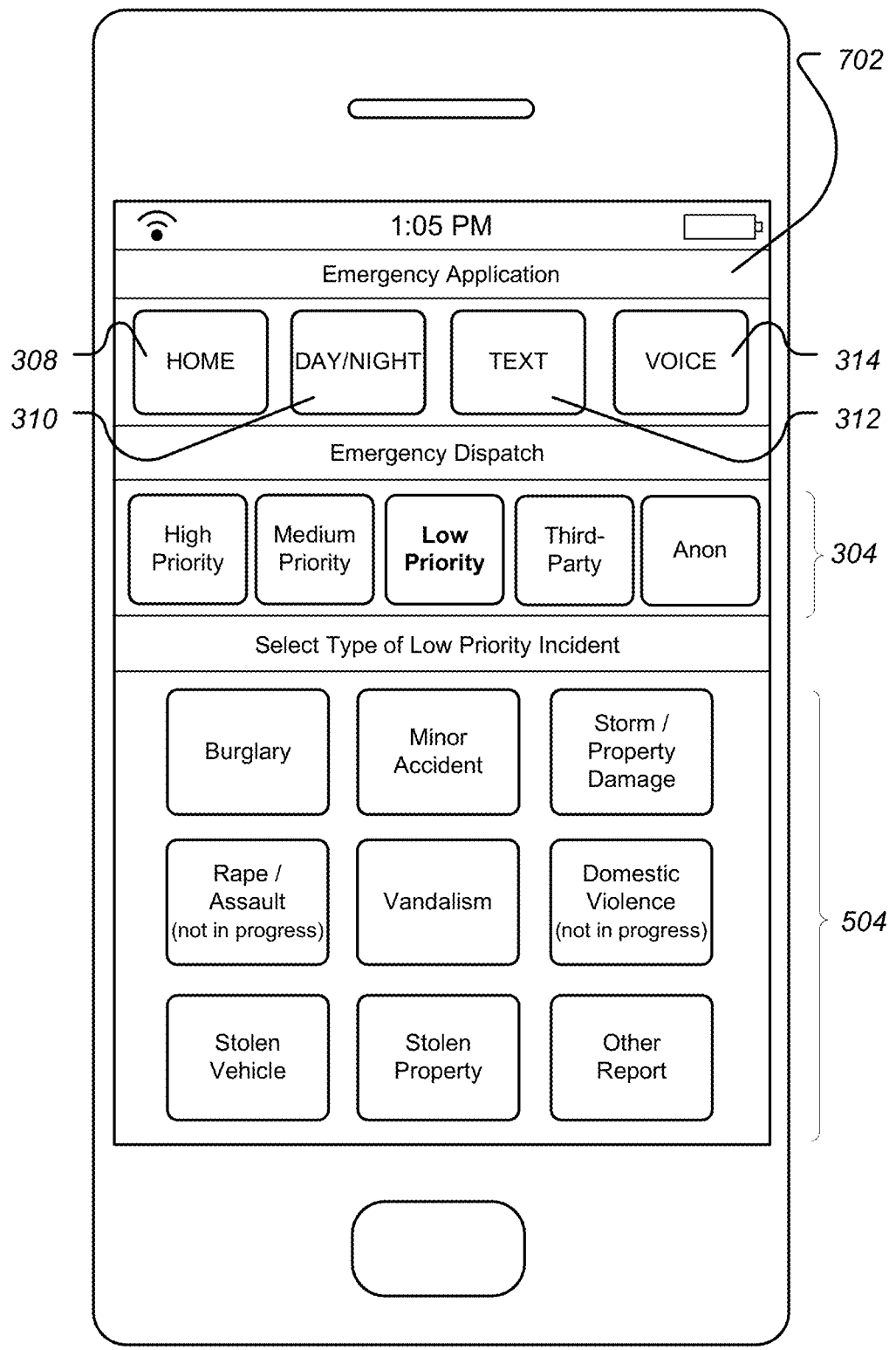
FIG. 7 illustrates an exemplary user interface of an emergency priority dispatch application for selecting an event type of a low priority emergency event.

FIG. 7 illustrates an exemplary user interface 702 of an EPD application 118 for selecting an event type 106 of a low priority emergency event 102. For example, upon receiving a selection of a low priority event priority 104, the user interface 702 may provide type controls 504 for a set of low priority event types 106, such as a burglary after the fact, an accident after the fact, a storm or property damage, a rape or assault after the fact, vandalism after the fact, a previous incident of domestic violence, a stolen vehicle, stolen property, or another type of report of an incident after the fact. The user interface 702 may be configured to allow a user to select the type control 504 associated with the event type 106 for the emergency event 102 being reported.

Figure 8:
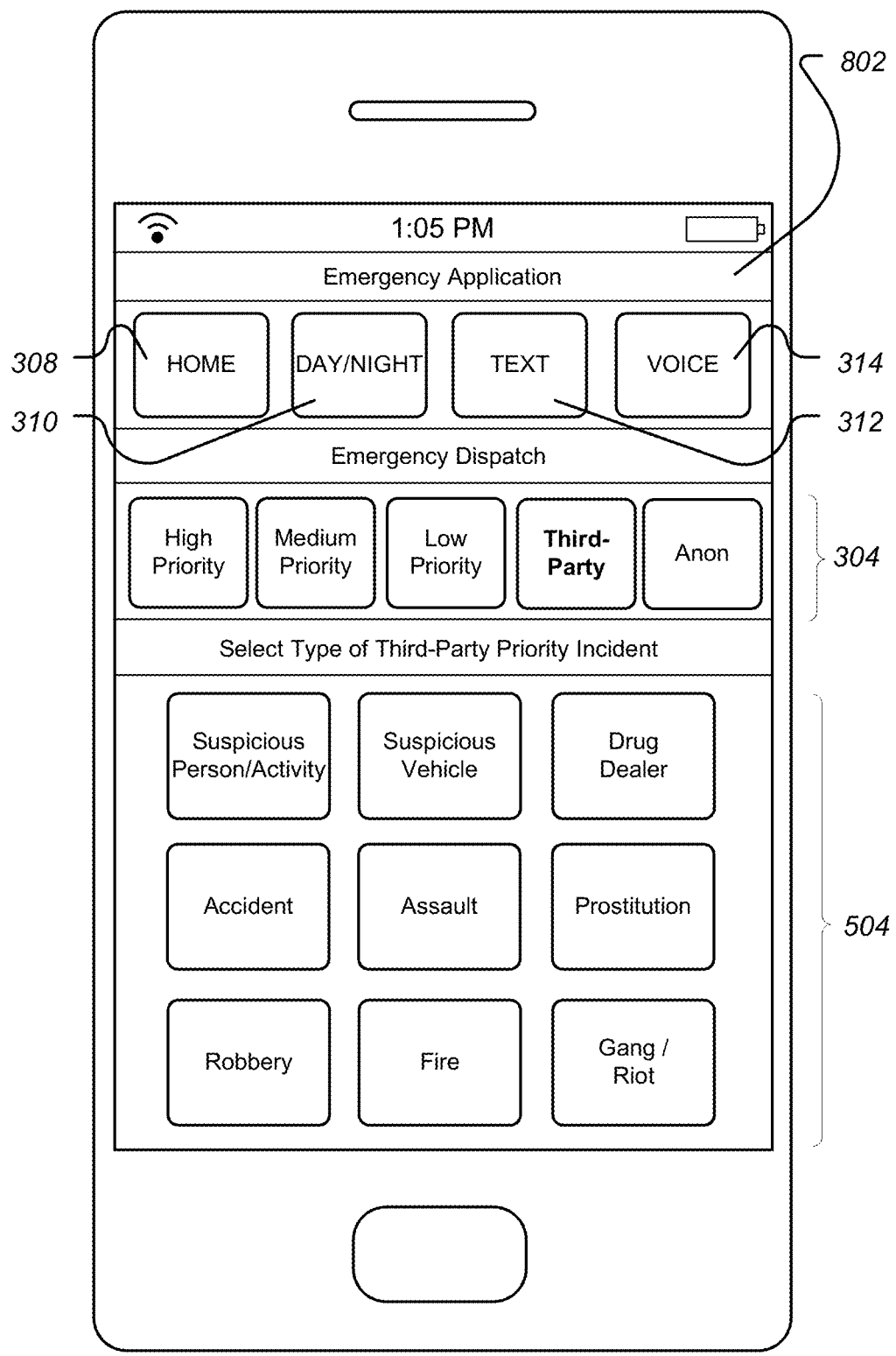
FIG. 8 illustrates an exemplary user interface of an emergency priority dispatch application for selecting an event type of a third-party priority emergency event.

FIG. 8 illustrates an exemplary user interface 802 of an EPD application 118 for selecting an event type 106 of a third-party priority emergency event 102. For example, upon receiving a selection of a third party event priority 104, the user interface 802 may provide type controls 504 for a set of third-party priority event types 106, such as a report of a suspicions person, a report of a suspicious vehicle, a report of a probable drug dealer, a report of an accident in which the third-party is not involved, a report of an assault in which the third-party is not involved, a report of probably prostitution, a report of a robbery in which the third-party is not involved, a report of a fire observed by the third-party, and a report of probable gang or riot activity. The user interface 802 may be configured to allow a user to select the type control 504 associated with the event type 106 for the emergency event 102 being reported.

Figure 9:
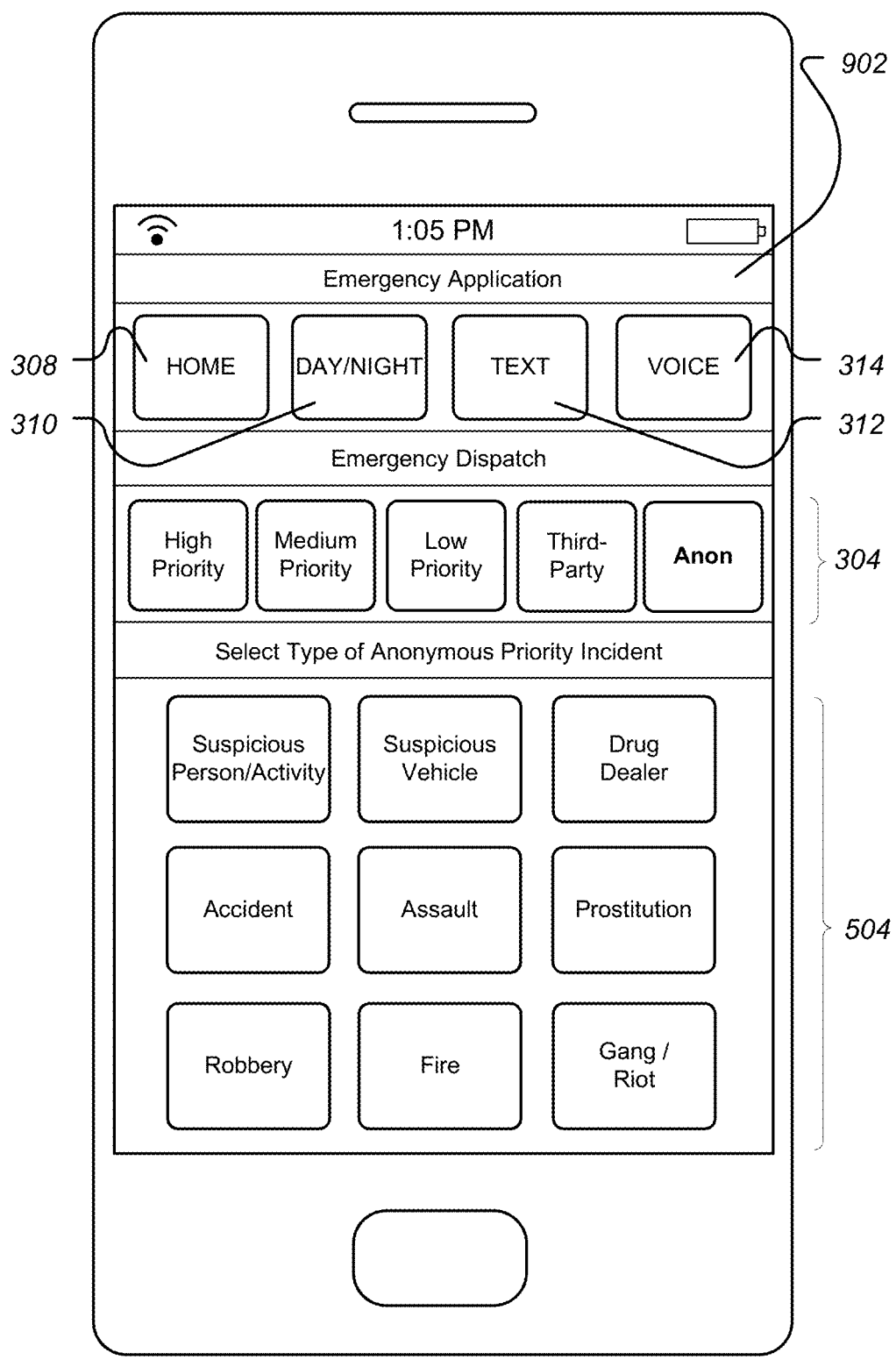
FIG. 9 illustrates an exemplary user interface of an emergency priority dispatch application for selecting an event type of an anonymous priority emergency event.

FIG. 9 illustrates an exemplary user interface 902 of an EPD application 118 for selecting an event type 106 of an anonymous priority emergency event 102. The user interface 902 may include similar options to those for the third-party priority emergency event 102, except that the identity of the reporter may be kept confidential for an anonymous priority event type 106.

Figure 10:
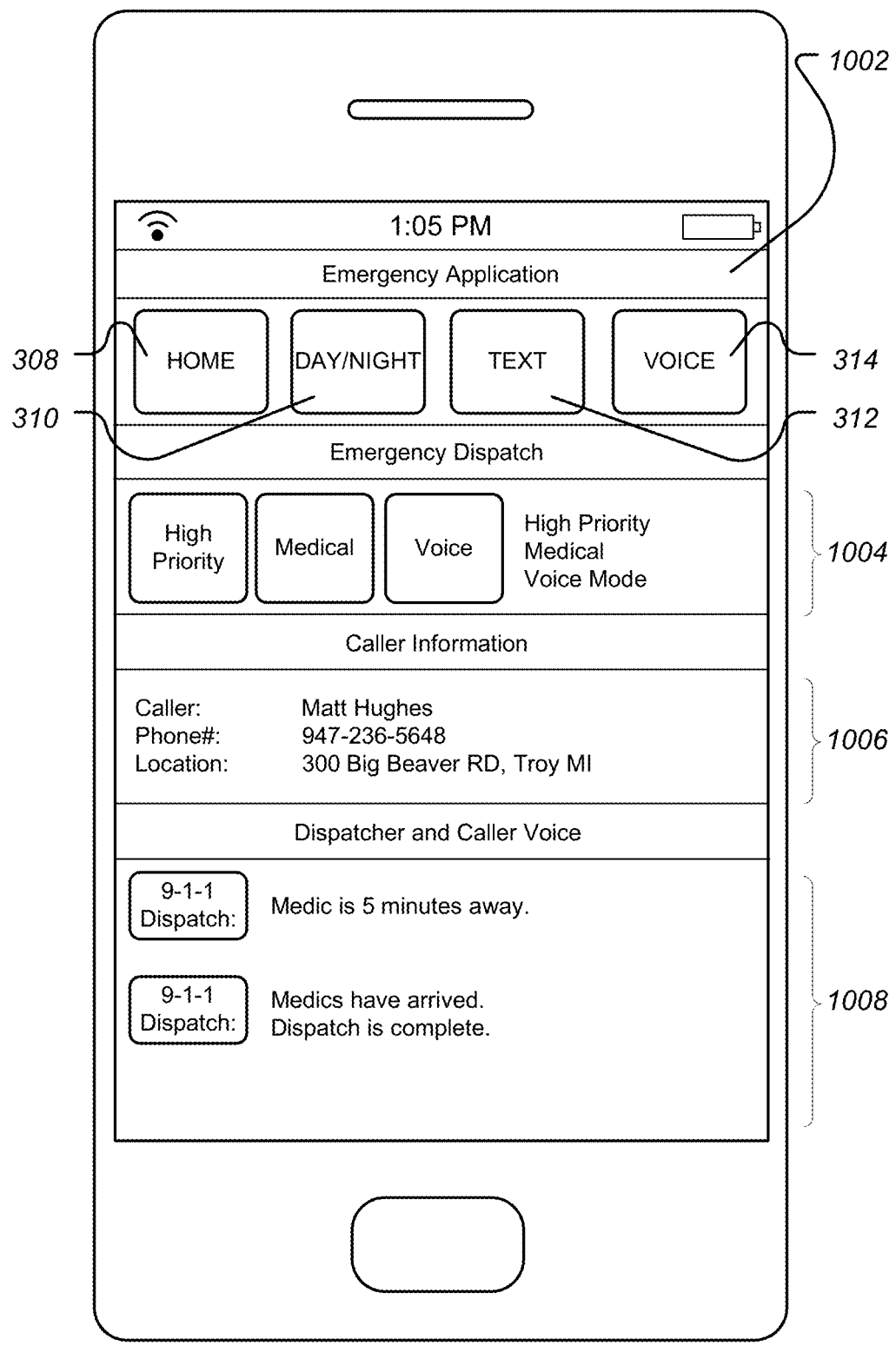
FIG. 10 illustrates an exemplary user interface of an emergency priority dispatch application for communicating information with emergency dispatch.

FIG. 10 illustrates an exemplary user interface 1002 of an EPD application 118 for communicating information with emergency dispatch. The user interface 1002 may be provided by the EPD application 118 upon providing an emergency event 102 based on a selection of an event priority 104 and an event type 106. The user interface 1002 may include summary information 1004 relating to the emergency event 102 and caller information 1006 related to the caller reporting the emergency event.

The user interface 1002 may further allow for the display of dialog 1008 between the EPD application 118 and dispatch related to the emergency event 102 being reported. An exemplary dialog 1008 is illustrated in the user interface 1002, including updates from dispatch to the EPD application 118 indicating the status of dispatch in responding to the emergency event 102 being reported.

In some cases, the EPD application 118, CAP system 144 and CPD workstation 114 may establish a texting environment that allows the dispatcher/call-taker to communicate with the caller. This environment may be displayed in the dialog 1008 portion of the user interface 1002. The texting environment may provide pre-formatted phrases by way of the dialog 1008 portion of the user interface 1002 that are designed to receive a simple yes/no response, or to ask the caller to select from options that clearly explain the type of information needed in order to dispatch a first responder. The EPD application 118 may further provide controls in the user interface 1002 to allow for the reception of responses from the caller, such as yes and no buttons to receive yes or no responses, or option controls in response to multiple choice questions from dispatch. These provided controls may allow for the caller to respond to questions from dispatch while minimizing keystrokes. The dialogue between the dispatcher/call-taker and the caller may be electronically transferred to the CAD system 112 and may be associated with the emergency event 102.

Figure 11:
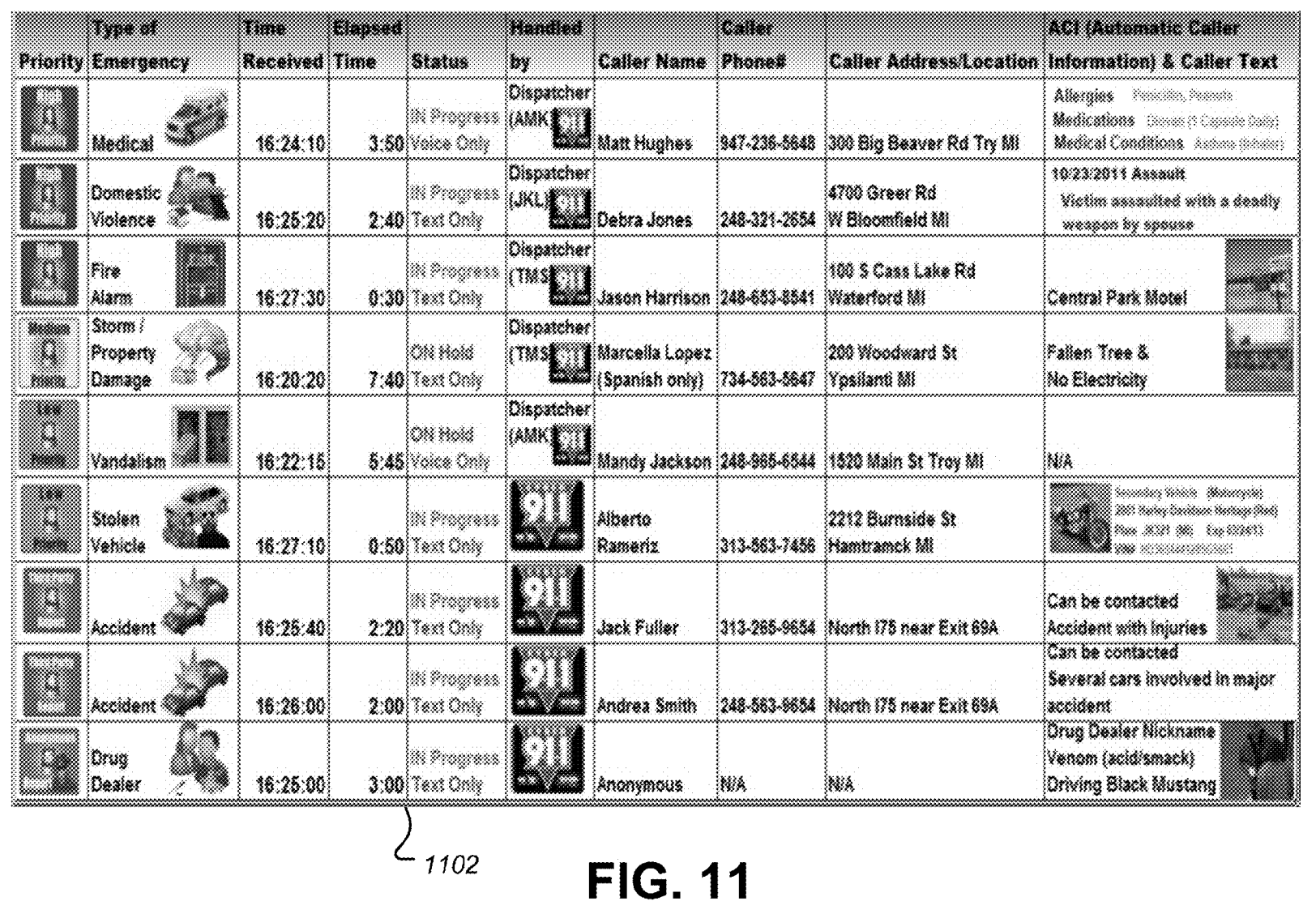

FIG. 11 illustrates an exemplary user interface 1102 of a CAP system 144. The user interface 1102 of the CAP system 144 may include be configured to present a listing of the emergency events 102 being handled by the CAP system 144. The user interface 1102 of the CAP system 144 may be configured to show the status of external connections or communications session with event reporters, which may include, but are not limited to, smartphones 116 having an EPD application 118, phone devices 122, burglar alarms 124, fire alarms 126, car alarms 128, medical alert devices 130, telematics units 132, and video feeds 134. Each communications session may be displayed on the user interface 1102 until its status is changed to completed by a dispatcher/call-taker. In some examples, the status of connections being handled by the CAEM 146 may automatically be set to complete by the CAEM 146 upon completion of handling the connection. Changing the status to complete may cause the connection to be dropped from the display.

For example, the user interface 1102 of the CAP system 144 may be configured to display pertinent information such as the event priority 104 of the emergency events 102, the event type 106 of the emergency events 102, and the event details 108 of the emergency event 102.

The user interface 1102 of the CAP system 144 may be further configured to display additional information related to the handling of the event, such as a time at which the emergency event 102 was received, an elapsed time the caller has been connected, a status indicative of whether the call has been handled and, if so, how (e.g., whether the caller is currently on hold or is communication with dispatch according to voice or text messaging), and whether the emergency event 102 is being handled by a dispatcher/call-taker or automatically by the CAEM 146.

The user interface 1102 of the CAP system 144 may be further configured to display additional information about the emergency event 102, such as a name of the caller (e.g., retrieved according to the ANI/ALI system 136 or a predetermined information supplemented according to a rule), a phone number of the caller, an address or location of the caller (e.g., retrieved according to ALI or GPS), as well as supplementary details of the emergency event 102, such as additional caller information retrieved from an ACI database 138 in communication with an ACI server 140.

The user interface 1102 may accordingly be used to provide an overall status of the emergency events 102 being handled by the CAD system 112. The combination of the user interface 1102 of the CAP system and the CAD system 112 may enable dispatch centers to respond to emergency requests in the most expeditious manner. For example, the user interface 1102 may allow a dispatcher to identify a set of multiple reported emergencies that all relate to a single underlying incident based on the displayed information. Accordingly the user interface 1102 information of the CAP system may reduce response time and increase the operational efficiency of each dispatch center.

Figure 12:
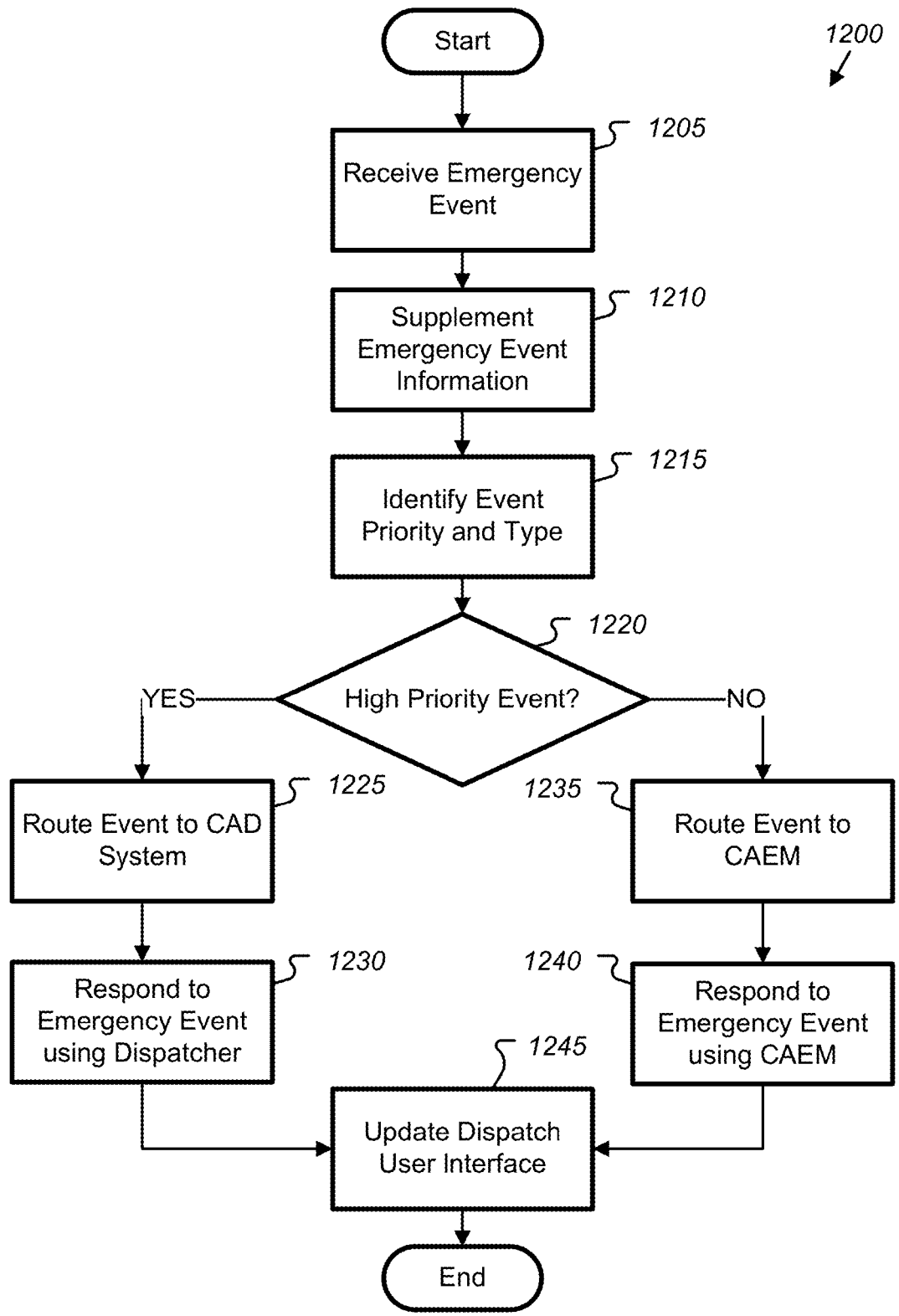
FIG. 12 illustrates an exemplary process for receiving and processing an emergency event according to an identified event priority and type.
Figure 13:
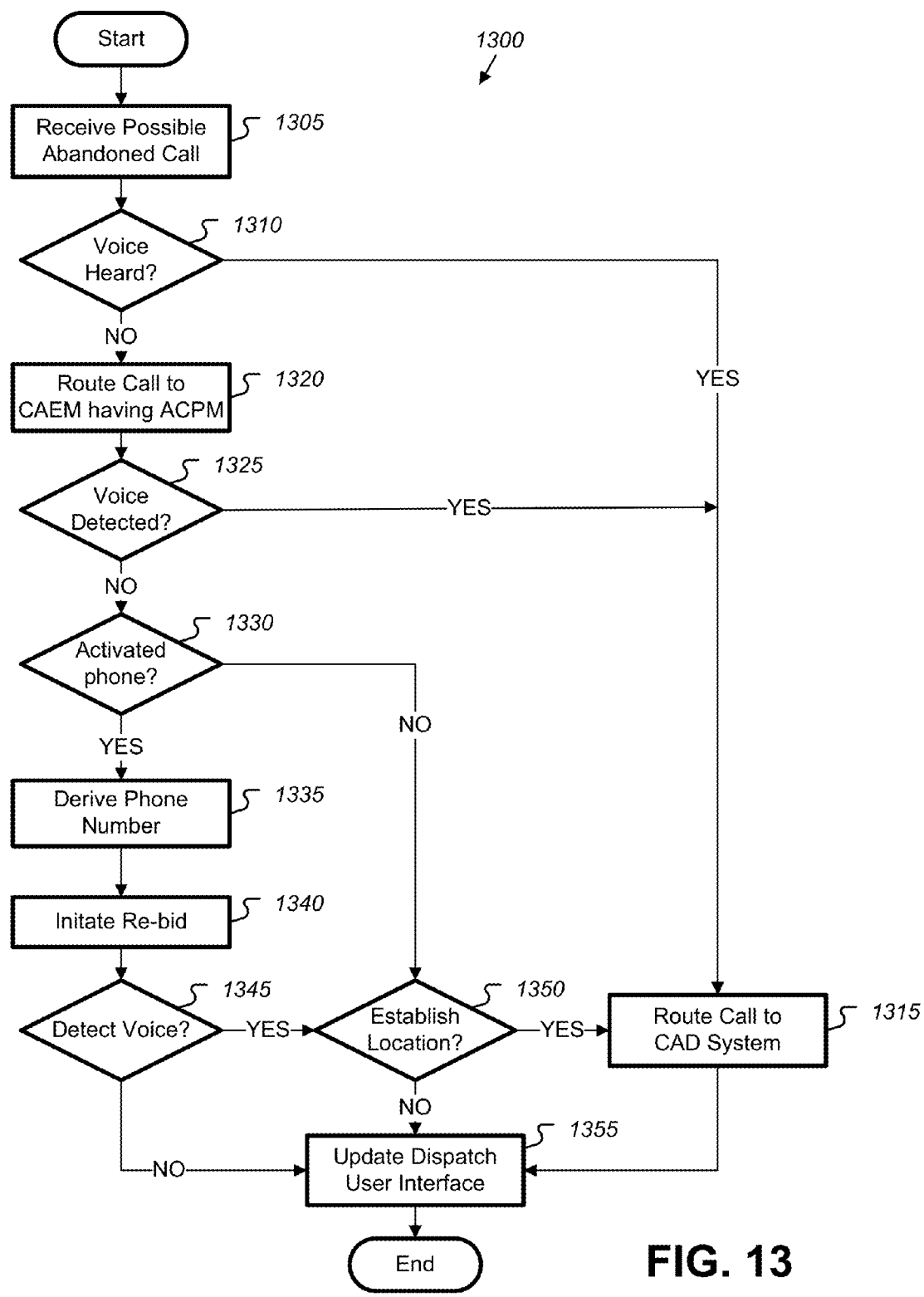
FIG. 13 illustrates an exemplary process for receiving and processing an abandoned call.

FIG. 12 illustrates an exemplary process 1200 for receiving and processing an emergency event 102 according to an identified event priority 104 and event type 106. The process 1200 may be performed by various devices, such as by the CAP system 144 in communication with one or more event reporters over a communications network 120.

In block 1205, the CAP system 144 receives an emergency event 102. The emergency event may include an event priority 104 and an event type 106. The event reporter may include reporters such as a smartphone 116 executing an EPD application 118, and may be generated by user interaction with a user interface of the EPD application 118 such as described above. The event reporter may also include a phone device 122, a burglar alarm 124, a fire alarm 126, a car alarm 128, a medical alert device 130, a telematics unit 132, or a video feed 134. In some cases, the emergency event 102 may be generated automatically based on the emergency event 102 being detected by the event reporter, such as the fire alarm 126 detecting a fire and sending an emergency event 102 with an event priority 104 of high and an event type 106 of fire emergency. In some cases, while waiting for a connection to be established between the event reporter and the CAP system 144 (such as via CAMA), the EPD application 118 may prompt the caller for one or more of event priority 104 and event type 106 to include in the emergency event 102.

In block 1210, the CAP system 144 supplements the emergency event 102 information. For example, the supplementation of the emergency event 102 may be performed according to one or more of the data flows 200-A and 200-B discussed in detail above with respect to FIGS. 2A and 2B.

In block 1215, the CAP system 144 identifies the event priority 104 and the event type 106 of the emergency event 102. This identification may be performed without querying the event reporter for additional event priority 104 and event type 106 information. Rather, the event priority 104 and the event type 106 information may be identified from the emergency event 102.

In block 1220, the CAP system 144 determines based on the emergency event 102, whether the emergency event 102 indicates a higher event priority 104 emergency event 102 to be handled by the CAD system 112 or a lower priority emergency event 102 to be handled automatically by the CAEM 146. If the emergency event 102 is determined to be of a higher event priority 104, control passes to block 1225. Otherwise, control passes to block 1235.

In block 1225, the CAP system 144 routes the emergency event 102 to the CAD system 112 for processing. Accordingly, the CAD system 112 may be configured to handle higher-priority emergency event 102 by way of a dispatcher/call-taker at the CAD system 112.

In block 1230, the CAP system 144 provides the emergency event 102 information to the dispatcher/call-taker. For example, the CAD system 112 may establish a communications session between a dispatcher/call-taker of the CAD system 112 and the reporting device (e.g., the smartphone 116 executing the EPD application 118), and may facilitate handling of the emergency event 102 via the dispatcher/call-taker. Rather than having to retrieve the event priority 104 and event type 106 from the caller, the dispatcher/call-taker may instead have the easier task of confirming the information already provided by the emergency event 102, and of receiving any additional information from the caller.

In block 1235 the CAP system 144 routes the emergency event 102 to the CAEM 146 for processing. Accordingly, the CAEM 146 may be configured to automatically handle lower-priority emergency event 102, without requiring the use of a dispatcher/call-taker at the CAD system 112.

In block 1240, the CAEM 146 automatically responds to the emergency event 102. For example, the CAEM 146 may be configured to return a message to the user indicating that the emergency event 102 was received and will be processed. The CAEM 146 may also be configured to request additional information from the reporter of the emergency event 102.

In block 1245, the CAP system 144 updates the dispatch user interface. For example, emergency event 102 information in a display such as the user interface 1102 may be updated with the current status of the emergency event 102 being handled. After block 1245 the process 1200 ends.

FIG. 12 illustrates an exemplary process 1300 for the CAEM 146 including the ACPM for receiving and processing possible abandoned calls. The process 1200 may be performed by various devices, such as by the CAP system 144 having the CAEM 146 and in communication with the PSAP 110, CAD system 112, and CPD workstation 114. The CAD system 112 may be configured to selectively route a possible abandoned call for an emergency event 102 between the CAEM 146 and CAD system 112 to manage the possible abandoned call.

At block 1305, the CAD system 112 may receive a call for an emergency event 102 from the PSAP 110 using CPE.

At block 1310, the emergency dispatcher, by way of CPD workstation 114 in communication with the CAD system 112, may listen to hear an audible voice for the minimal period. If the emergency dispatcher hears an audible voice, the emergency dispatcher may, by way of the CPD workstation 114, flag the call as an active call and transfer the call to the CAD system 112 in communication with the CPD workstation 114 of the emergency dispatcher. If the emergency dispatcher does not hear an audible voice, the emergency dispatcher, by way of the CPD workstation 114, may flag the call as a possible abandoned call and transfer the call to the CAEM 146 of the CAP system 144.

At block 1315, the CAD system 112 may route the possible abandoned call to the CAEM 146 of the CAP system 144, e.g., so that the emergency dispatcher may respond to the emergency event 102 and dispatch a first responder accordingly.

At block 1320, the CAP system 144, using the CAEM 146, may receive the call. The CAP system 144 may record and monitor the possible abandoned call.

At block 1325, the CAP system 144, using the CAEM 146, may store a call recording of the possible abandoned call and monitor the call for an audible voice for a first automated monitoring period, e.g., 30 to 50 seconds. If the CAP system 144 detects an audible voice, the CAP system 144 may immediately transfer the call back to the CAD system 112 in communication with the CPD workstation 114 of the emergency dispatcher. If the CAP system 144 does not detect an audible voice, the CAP system 144 may determine whether the call is from an activated or de-activated phone number.

At block 1330, the CAP system 144, using the CAEM 146, may determine whether the call is from an activated or de-activated phone number according to the ANI database. If the call is from an activated phone number, the CAP system 144 may determine the phone number according to the ANI database. If the call is from a de-activated phone number, the CAP system 144 may determine whether a caller location may be established, e.g., by way of an ALI database, cellular triangulation, GPS, or a combination thereof.

At block 1335, the CAP system 144, using the CAEM 146, may determine the phone number according to the ANI database.

At block 1340, the CAP system 144, using the CAEM 146, may initiate a re-bid to call back the caller according to the determined phone number.

At block 1345, the CAP system 144, using the CAEM 146, may record the possible abandoned call and monitor the call for a second automated monitoring period, e.g., 30 to 50 seconds. If the CAP system 144 detects an audible voice, the CAP system 144 may utilize the ACPM to immediately transfer the call back to the CAD system 112 in communication with the CPD workstation 114 of the emergency dispatcher. If the CAP system 144 does not detect an audible voice, the CAP system 144 may update the user interface 1102, e.g., with the current status of the emergency event 102.

At block 1350, the CAP system 144, using the CAEM 146, may determine whether caller location information may be established, e.g., by way of an ALI database, cellular triangulation, GPS, or a combination thereof. If the caller location is established, the CAP system 144 may transfer the call, along with emergency event 102 information, to the CAD system 112 in communication with the CPD workstation 114 of the emergency dispatcher. If the caller location is not established, the CAP system 144 may update the user interface 1102, e.g., with the current status of the emergency event 102.

At block 1355, the CAP system 144, using the CAEM 146, may update the dispatch user interface. For example, emergency event 102 information in a display such as the user interface 1102 may be updated with the current status of the emergency event 102 being handled. After block 1355, the process 1300 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

In general, computing systems and/or devices, such as smartphone 116, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as smartphone 116 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The EPD application 118 may be one such computer program product. In some example, the EPD application 118 may be provided as software that when executed by the processor provides the operations described herein. Alternatively, the EPD application 118 may be provided as hardware or firmware, or combinations of software, hardware and/or firmware.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
    a computer aided prioritization (CAP) system in communication with a computer aided dispatch (CAD) system and a computer aided event module (CAEM) including an abandoned call processing method (ACPM), the CAP system configured to:
    receive a possible abandoned call for an emergency event;
    monitor the possible abandoned call for a first automated monitoring period;
    determine whether the possible abandoned call includes an audible voice; and
    selectively route the possible abandoned call to at least one of the computer aided dispatch (CAD) system and the computer aided event module (CAEM) according to the determination, wherein the possible abandoned call is flagged as abandoned by an emergency dispatcher using a caller priority dispatch (CPD) workstation after listening to the possible abandoned call for a minimal time period and prior to the CAP system receiving the possible abandoned call.

2. The system of claim 1, wherein the CAP system is further configured to store a first call recording of the possible abandoned call for the first automated monitoring period.

3. The system of claim 1, wherein the CAP system is further configured to receive a phone number for the possible abandoned call from an Automatic Number Identification (ANI) database.

4. The system of claim 1, wherein the CAP system is further configured to initiate a re-bid if the possible abandoned call is from an activated phone number according to an Automatic Number Identification (ANI) database.

5. The system of claim 1, wherein the CAP system is further configured to establish a call location derived from at least one of an Automatic Location Identification (ALI) database, cellular triangulation, and a global positioning system (GPS).

6. The system of claim 1, wherein the CAP system is further configured to route the possible abandoned call to the CAD system in response to detecting an audible voice and establishing a call location.

7. A method comprising:
    receiving, by a computer aided prioritization (CAP) system in communication with a computer aided dispatch (CAD) system and a computer aided event module (CAEM) including an abandoned call processing method (ACPM), a possible abandoned call for an emergency event;
    monitoring, by the CAP system, the possible abandoned call for a first automated monitoring period;
    determining, by the CAP system, whether the possible abandoned call includes an audible voice; and
    selectively routing, by the CAP system, the possible abandoned call to at least one of the computer aided dispatch (CAD) system and the computer aided event module (CAEM) according to the determination, wherein the method further comprising flagging, by an emergency dispatcher using a caller priority dispatch (CPD) workstation, the possible abandoned call as abandoned after listening to the possible abandoned call for a minimal time period and prior to the CAP system receiving the possible abandoned call.

8. The method of claim 7, further comprising storing, by the CAP system, a first call recording of the possible abandoned call for the first automated monitoring period.

9. The method of claim 7, further comprising receiving, by the CAP system, a phone number for the possible abandoned call from an Automatic Number Identification (ANI) database.

10. The method of claim 7, further comprising initiating, by the CAP system, a re-bid if the possible abandoned call is from an activated phone number according to an Automatic Number Identification (ANI) database.

11. The method of claim 7, further comprising establishing, by the CAP system, a caller location derived from at least one of an Automatic Location Identification (ALI) database, cellular triangulation, and a global positioning system (GPS).

12. The method of claim 7, further comprising routing, by the CAP system, the possible abandoned call to the CAD system in response to detecting an audible voice and establishing a call location.

13. A non-transitory computer readable medium storing instructions that are executable to provide operations comprising:

receive, by a computer aided prioritization (CAP) system in communication with a computer aided dispatch (CAD) system and a computer aided event module (CAEM) including an abandoned call processing method (ACPM), a possible abandoned call for an emergency event;

monitor, by the CAP system, the possible abandoned call for a first automated monitoring period; determine, by the CAP system, whether the possible abandoned call includes an audible voice; and selectively route, by the CAP system, the possible abandoned call to at least one of the computer aided dispatch (CAD) system and the computer aided event module (CAEM) according to the determination, wherein the medium further comprising flag, by an emergency dispatcher using a caller priority dispatch (CPD) workstation, the possible abandoned call as abandoned after listening to the possible abandoned call for a minimal time period and prior to the CAP system receiving the possible abandoned call.

14. The medium of claim 13, further comprising store, by the CAP system, a first call recording of the possible abandoned call for the first automated monitoring period.

15. The medium of claim 13, further comprising receive, by the CAP system, a phone number for the possible abandoned call from an Automatic Number Identification (ANI) database.

16. The medium of claim 13, further comprising initiate, by the CAP system, a re-bid if the possible abandoned call is from an activated phone number according to an Automatic Number Identification (ANI) database.

17. The medium of claim 13, further comprising route, by the CAP system, the possible abandoned call to the CAD system in response to detecting an audible voice and establishing a call location.

* * * * *